United States Patent
Dharmaraj et al.

(10) Patent No.: US 10,207,827 B2
(45) Date of Patent: Feb. 19, 2019

(54) ARTIFICIAL GRAVITY SYSTEM HAVING GRAVITY CHAMBERS WITH RIGID SIDE WALLS THAT ARE EXTENDIBLE

(71) Applicant: The Boeing Company, Chicago, IL (US)

(72) Inventors: Raju Dharmaraj, League City, TX (US); Thomas Hoffman, Friendswood, TX (US); Craig Stanton, Seabrook, TX (US); Patrick A. Swartzell, Pearland, TX (US)

(73) Assignee: The Boeing Company, Chicago, IL (US)

( * ) Notice: Subject to any disclaimer, the term of this patent is extended or adjusted under 35 U.S.C. 154(b) by 53 days.

(21) Appl. No.: 15/633,197

(22) Filed: Jun. 26, 2017

(65) Prior Publication Data
US 2018/0370661 A1 Dec. 27, 2018

(51) Int. Cl.
*B64G 1/60* (2006.01)
*B64G 1/46* (2006.01)

(52) U.S. Cl.
CPC ........ *B64G 1/60* (2013.01); *B64G 1/46* (2013.01)

(58) Field of Classification Search
CPC ..... B64G 1/12; B64G 1/46; B64G 1/60; B64G 1/64
See application file for complete search history.

(56) References Cited

U.S. PATENT DOCUMENTS

| | | | | |
|---|---|---|---|---|
| 3,144,219 A | * | 8/1964 | Schnitzer | B64G 1/16 114/116 |
| 3,210,026 A | * | 10/1965 | Frisch | B64G 1/12 244/159.4 |
| 3,744,739 A | * | 7/1973 | Weaver | B64G 1/12 244/172.4 |
| 3,864,771 A | * | 2/1975 | Bauer | B63B 22/22 220/8 |
| 4,562,979 A | * | 1/1986 | Taylor | B64G 9/00 220/8 |
| 4,643,375 A | | 2/1987 | Allen | |

(Continued)

OTHER PUBLICATIONS

Chung, Winchell. "Artificial Gravity." Retrieved from Internet Archive Wayback Machine as the website appeared on Jan. 9, 2016. URL for Internet Archive retrieval: <https://web.archive.org/web/20160109081205/http://www.projectrho.conn/public_html/rocket/artificialgrav.php> (Year: 2016).*

*Primary Examiner* — Richard R. Green
*Assistant Examiner* — Michael B. Kreiner
(74) *Attorney, Agent, or Firm* — Duft & Bornsen, PC

(57) ABSTRACT

A habitation module that provides an artificial gravity environment. In one embodiment, the habitation module includes a rotating structure that rotates about an axis in relation to a stationary structure. The rotating structure includes a first gravity chamber that projects radially from the rotating structure, and a second gravity chamber that projects radially from the rotating structure in an opposite direction than the first gravity chamber. The first gravity chamber and the second gravity chamber are each comprised of a plurality of ring members that form side walls of the first gravity chamber and the second gravity chamber. The ring members are concentric so that the side walls of the first gravity chamber and the second gravity chamber radially extend and radially contract in upon themselves.

22 Claims, 15 Drawing Sheets

(56) References Cited

U.S. PATENT DOCUMENTS

| | | | | |
|---|---|---|---|---|
| 6,216,984 B1* | 4/2001 | Brinsmade | ............... | B64G 1/12 244/159.4 |
| 6,523,782 B2* | 2/2003 | Barutt | ..................... | B64G 1/12 244/171.9 |
| 6,547,189 B1* | 4/2003 | Raboin | ................... | B64G 1/12 244/158.3 |
| 9,090,361 B2* | 7/2015 | Clay | ....................... | B64G 1/14 |
| 9,359,091 B2* | 6/2016 | Biddlecom | ............. | B64G 1/46 |
| 9,776,743 B2* | 10/2017 | Dharmaraj | .............. | B64G 1/12 |
| 9,908,644 B2* | 3/2018 | Dharmaraj | .............. | B64G 1/60 |
| 9,994,338 B2* | 6/2018 | Dharmaraj | .............. | B64G 1/46 |
| 10,059,469 B2* | 8/2018 | Dharmaraj | .............. | B64G 1/12 |
| 10,077,121 B2* | 9/2018 | Dharmaraj | .............. | B64G 1/60 |
| 2014/0124627 A1* | 5/2014 | Clay | ....................... | B64G 1/14 244/159.3 |
| 2017/0197734 A1* | 7/2017 | Dharmaraj | .............. | B64G 1/12 |
| 2017/0197735 A1* | 7/2017 | Dharmaraj | .............. | B64G 1/16 114/116 |
| 2017/0197736 A1* | 7/2017 | Dharmaraj | .............. | B64G 1/46 |
| 2017/0197737 A1* | 7/2017 | Dharmaraj | .............. | B64G 1/60 |
| 2017/0197738 A1* | 7/2017 | Dharmaraj | .............. | B64G 1/46 |
| 2017/0240302 A1* | 8/2017 | Dharmaraj | .............. | B64G 1/60 |
| 2017/0240303 A1* | 8/2017 | Dharmaraj | .............. | B64G 1/60 |
| 2017/0361950 A1* | 12/2017 | Dharmaraj | .............. | B64G 1/46 |

* cited by examiner

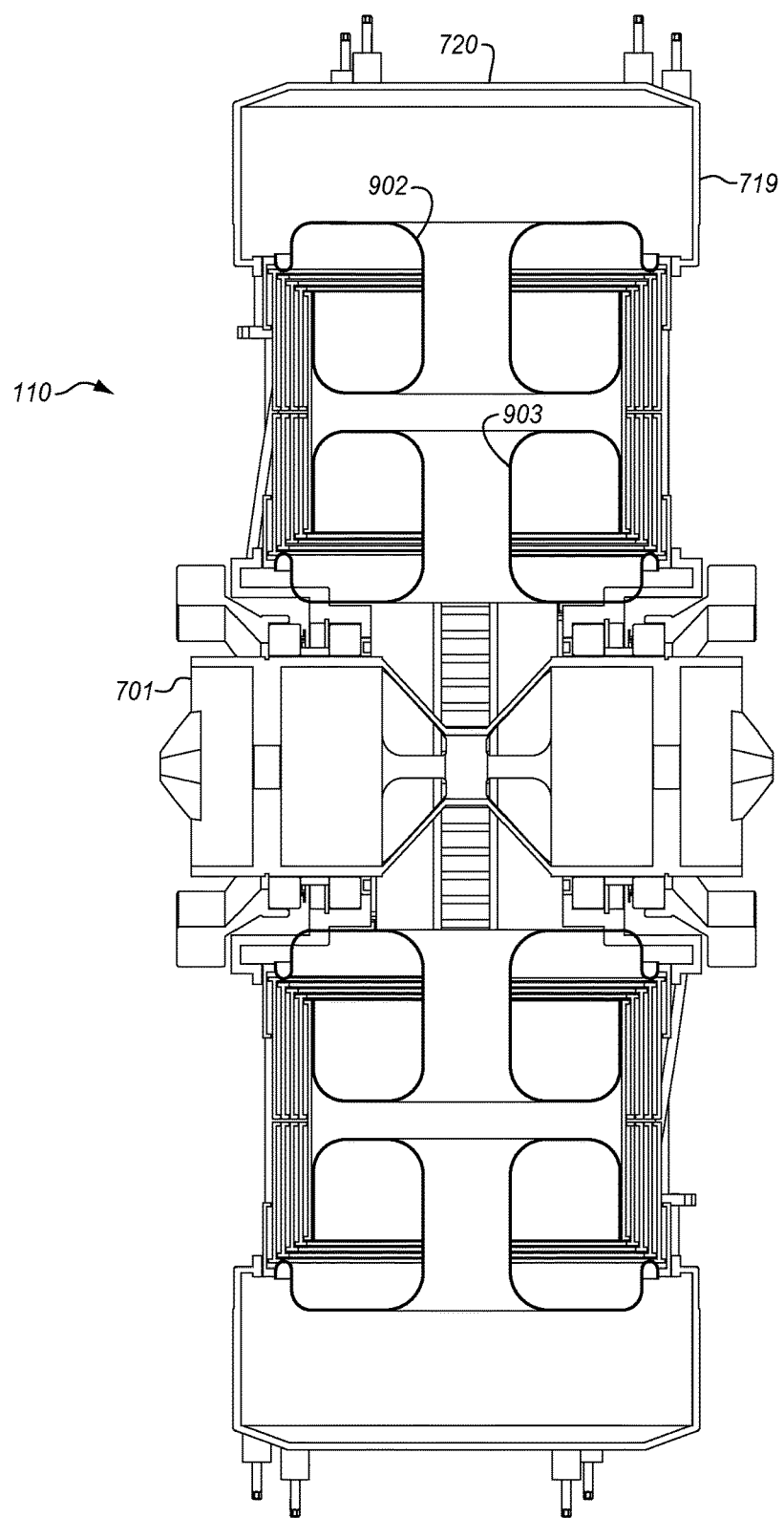

ARTIFICIAL GRAVITY SYSTEM HAVING GRAVITY CHAMBERS WITH RIGID SIDE WALLS THAT ARE EXTENDIBLE

FIELD

This disclosure relates to the field of habitation modules that provide artificial gravity environments.

BACKGROUND

When humans occupy a space station, they encounter a zero-gravity environment or "weightless" environment. Extended exposure to a zero-gravity environment can be detrimental to the health of the human occupants, such as muscle and bone degeneration. To avoid these long-term health effects, artificial gravity environments may be installed in the space station. One way to create artificial gravity is with centrifugal force, where a vessel rotates at a speed that drives a human occupant inside of the vessel toward the outer hull of the vessel. The force on the human occupant feels like a gravitational pull.

Because of the health benefits and comfort of artificial gravity, it is desirable to design improved artificial gravity environments for space habitats/vehicles.

SUMMARY

Embodiments described herein include a habitation module for a space station or the like that includes a stationary structure and a rotating structure that is slid upon the stationary structure. The rotating structure has two gravity chambers, attached to the rotating structure at each end of a tunnel structure, that are capable of being extended and contracted. The gravity chambers are driven to rotate about an axis in relation to the stationary structure to create artificial gravity within each of the gravity chambers. The side walls of the gravity chambers are concentric rigid cylindrical volumes arranged in a collapsible configuration that are able to be extended and contracted radially from the axis of rotation of the rotating structure. The gravity chambers may be contracted to reduce the size of the habitation module for loading into a launch vehicle. The gravity chambers may be extended to increase the rotation radius of the gravity chambers when the habitation module is placed into service in space. As it may be beneficial to have the interior of the gravity chambers pressurized so that crew members don't need to wear pressurized suits, radial pressure seals may be installed at the connection points between the rotating structure and the stationary structure to provide an air-tight juncture between the rotating structure and the stationary structure. Tubular seals may be installed within the walls of the gravity chambers so that the gravity chambers may be pressurized. As the artificial gravity environment is created in the gravity chambers, crew members may enter the gravity chambers for exercise, rest, lounging, or other activities. The artificial gravity environment provides health benefits to the crew members.

One embodiment comprises a habitation module that includes a rotating structure that rotates about an axis in relation to a stationary structure. The rotating structure includes a first gravity chamber that projects radially from the rotating structure, and a second gravity chamber that projects radially from the rotating structure in an opposite direction than the first gravity chamber. The first gravity chamber and the second gravity chamber are each comprised of a plurality of ring members that form side walls of the first gravity chamber and the second gravity chamber. The ring members are concentric so that the side walls of the first gravity chamber and the second gravity chamber radially extend and radially contract in upon themselves.

In another embodiment, the habitation module includes one or more radial pressure seals that form an air-tight seal between the rotating structure and the stationary structure, a first seal element that extends through an interior of the first gravity chamber to create an air-tight cavity within the interior of the first gravity chamber, and a second seal element that extends through an interior of the second gravity chamber to create an air-tight cavity within the interior of the second gravity chamber.

In another embodiment, the rotating structure further includes a hub member that slides onto the stationary structure, and attaches to the stationary structure through rotatable attachment members. Each of the first gravity chamber and the second gravity chamber is comprised of a base member that is affixed to the hub member, an end member that serves as a floor, and the ring members that connect between the base member and the end member.

In another embodiment, a middle one of the ring members between the base member and the end member has a diameter that is smallest among the ring members. The ring members between the middle one of the ring members and the base member have a successively increasing diameter. The ring members between the middle one of the ring members and the end member have a successively increasing diameter.

In another embodiment, the first seal element comprises a first tubular seal, where a first end of the first tubular seal is affixed around an inner surface of the end member, and a second end of the first tubular seal is affixed around an inner surface of the middle one of the ring members. The first seal element also comprises a second tubular seal, where a first end of the second tubular seal is affixed around an inner surface of the base member, and a second end of the second tubular seal is affixed around the inner surface of the middle one of the ring members.

In another embodiment, each of the ring members includes one or more flanges that protrude from the ring member to engage a neighboring ring member, the base member, or the end member.

In another embodiment, the rotating structure includes first extension rods affixed at a first end to a first end member of the first gravity chamber, and first guide rings affixed to the hub member, where a second end of the first extension rods is configured to slide through the first guide rings. The rotating structure further includes second extension rods affixed at a first end to a second end member of the second gravity chamber, and second guide rings affixed to the hub member, where a second end of the second extension rods is configured to slide through the second guide rings.

In another embodiment, the rotating structure includes first safety locks that secure the second end of the first extension rods to one of the first guide rings when the first gravity chamber is extended, and second safety locks that secure the second end of the second extension rods to one of the second guide rings when the second gravity chamber is extended.

In another embodiment, the rotating structure includes first launch locks that secure the second end of the first extension rods to the second end member of the second gravity chamber when the first gravity chamber is contracted, and second launch locks that secure the second end of the second extension rods to the first end member of the first gravity chamber when the second gravity chamber is contracted.

In another embodiment, the stationary structure comprises a first cylindrical body member and a second cylindrical body member that are spaced apart and aligned co-axially via a support structure. The rotatable attachment members comprise a pair of support bearings, where a first one of the support bearings is mounted between the first cylindrical body member and a first bearing housing of the hub member, and a second one of the support bearings is mounted between the second cylindrical body member and a second bearing housing of the hub member.

In another embodiment, the one or more radial pressure seals comprise a first radial pressure seal that spans a first gap between the first cylindrical body member and the first bearing housing of the hub member, and a second radial pressure seal that spans a second gap between the second cylindrical body member and the second bearing housing of the hub member.

In another embodiment, the habitation module further includes a drive mechanism configured to rotate the rotating structure about the axis in relation to the stationary structure to simulate a gravitational force within the first gravity chamber and the second gravity chamber. The habitation module further includes a ring gear affixed to the first bearing housing of the hub member, and having teeth that mesh with teeth on the drive mechanism.

In another embodiment, the habitation module further includes a counter-rotating mechanism that rotates about the axis in an opposite direction than the rotating structure.

Another embodiment comprises a habitation module that includes a stationary structure comprising a first cylindrical body member and a second cylindrical body member that are spaced apart and aligned co-axially via a support structure. The habitation module includes a rotating structure that attaches to the stationary structure through rotatable attachment members, and rotates about an axis in relation to the stationary structure. The rotating structure includes a hub member comprising a hollow cylinder with transverse openings that are coaxially aligned on opposing sides of the hub member along the axis to slide onto the stationary structure. The rotating structure includes a first gravity chamber that projects radially from a first end of the hub member, and a second gravity chamber that projects radially from a second end of the hub member in an opposite direction than the first gravity chamber. The first gravity chamber and the second gravity chamber are each comprised of a plurality of ring members that form side walls of the first gravity chamber and the second gravity chamber. The ring members are concentric so that the side walls of the first gravity chamber and the second gravity chamber radially extend and contract. The habitation module includes a first radial pressure seal mounted on the first cylindrical body member that spans a first gap between the first cylindrical body member and the hub member. The habitation module includes a second radial pressure seal mounted on the second cylindrical body member that spans a second gap between the second cylindrical body member and the hub member. The habitation module includes a first seal element that extends through an interior of the first gravity chamber to create an air-tight cavity within the interior of the first gravity chamber. The habitation module includes a second seal element that extends through an interior of the second gravity chamber to create an air-tight cavity within the interior of the second gravity chamber.

In another embodiment, each of the first gravity chamber and the second gravity chamber is comprised of a base member that is affixed to the hub member, an end member that serves as a floor, and the ring members that connect between the base member and the end member.

In another embodiment, a middle one of the ring members between the base member and the end member has a diameter that is smallest among the ring members. The ring members between the middle one of the ring members and the base member have a successively increasing diameter, and the ring members between the middle one of the ring members and the end member have a successively increasing diameter.

In another embodiment, the first seal element comprises a first tubular seal, where a first end of the first tubular seal is affixed around an inner surface of the end member, and a second end of the first tubular seal is affixed around an inner surface of the middle one of the ring members. The first seal element further comprises a second tubular seal, where a first end of the second tubular seal is affixed around an inner surface of the base member, and a second end of the second tubular seal is affixed around the inner surface of the middle one of the ring members.

In another embodiment, the rotatable attachment members comprise support bearings. A first one of the support bearings is mounted between the first cylindrical body member and a first bearing housing of the hub member, and a second one of the support bearings is mounted between the second cylindrical body member and a second bearing housing of the hub member.

In another embodiment, the first radial pressure seal spans the first gap between the first cylindrical body member and the first bearing housing of the hub member, and is mounted between the first one of the support bearings and an interior of the hub member. The second radial pressure seal spans the second gap between the second cylindrical body member and the second bearing housing of the hub member, and is mounted between the second one of the support bearings and the interior of the hub member.

Another embodiment comprises a habitation module that includes a stationary structure, and a rotating structure that rotates about an axis in relation to the stationary structure. The rotating structure includes a hub member comprising a hollow cylinder with transverse openings that are coaxially aligned on opposing sides of the hub member along the axis to slide onto the stationary structure and attach to the stationary structure through rotatable attachment members. The rotating structure includes a first gravity chamber that projects radially from a first end of the hub member, and a second gravity chamber that projects radially from a second end of the hub member in an opposite direction than the first gravity chamber. Each of the first gravity chamber and the second gravity chamber is comprised of a base member that is affixed to the hub member, an end member that serves as a floor, and a plurality of ring members that connect between the base member and the end member to form a side wall. The ring members are concentric so that the side wall radially extends and contracts.

In another embodiment, the habitation module includes a first seal element that extends through an interior of the first gravity chamber to create an air-tight cavity within the interior of the first gravity chamber, and a second seal element that extends through an interior of the second gravity chamber to create an air-tight cavity within the interior of the second gravity chamber.

In another embodiment, the habitation module further includes a first radial pressure seal and a second radial pressure seal. The stationary structure comprises a first cylindrical body member and a second cylindrical body member that are spaced apart and aligned co-axially via a support structure. The first radial pressure seal is mounted on the first cylindrical body member, and spans a first gap between the first cylindrical body member and the hub member. The second radial pressure seal is mounted on the second cylindrical body member, and spans a second gap between the second cylindrical body member and the hub member.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

FIGS. 9A-9B are cross-sectional views of a gravity chamber illustrating tubular seals in an exemplary embodiment.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
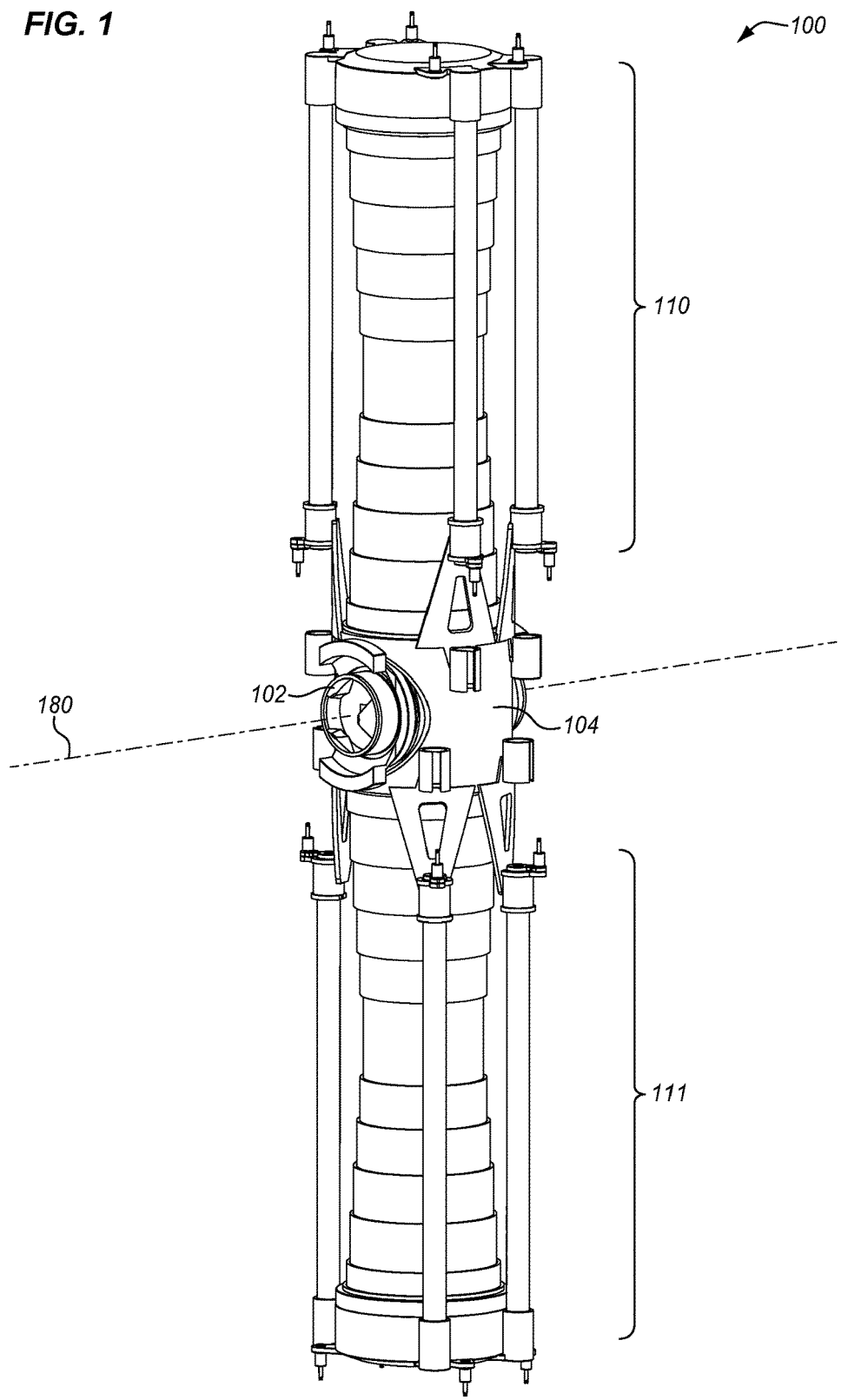
FIG. 1 illustrates a habitation module in an exemplary embodiment.

FIG. 1 illustrates a habitation module 100 in an exemplary embodiment. Habitation module (HAB) 100 is a module used for living quarters for crew members of a space station, such as the International Space Station. For example, HAB 100 may be used for sleeping quarters, restroom facilities, medical facilities, exercise facilities, etc. HAB 100 is configured for space vehicles in Low-Earth Orbit (LEO) or Beyond Low-Earth Orbit (BLEO).

HAB 100 includes a stationary structure 102 and a rotating structure 104 configured to rotate in relation to stationary structure 102 about an axis 180. Each end of rotating structure 104 includes a gravity chamber 110-111 for HAB 100. Gravity chambers 110-111 comprise the pods or compartments of HAB 100 where crew members may experience artificial gravity. Crew members are able to enter the interiors of gravity chambers 110-111. With crew members inside, rotating structure 104 is driven to rotate at a speed about axis 180 to create an artificial gravity environment within gravity chambers 110-111. For example, rotating structure 104 may be driven at 5 rpm, 10 rpm, 12 rpm, etc., to generate simulated gravity, such as in the range of 0.2 G to 1 G. The speed of rotation is adjustable depending on the comfort of the crew members and the desired artificial gravity inside of gravity chambers 110-111. The interior of gravity chambers 110-111 may be hollow or empty to form open quarters for crew members. The interior of gravity chambers 110-111 may include a treadmill, an exercise bike, or any other exercise equipment. The interior of gravity chambers 110-111 may include restroom facilities (e.g., a shower, a toilet, a sink, etc.), office facilities (e.g., a desk, chairs, cabinets, etc.), lounge facilities (e.g., chairs, a couch, etc.), sleeping facilities (e.g., a bed), or any other facilities. Gravity chambers 110-111 may also be compartmentalized into individual rooms. In the embodiments described below, gravity chambers 110-111 are extendable and retractable radial to the axis 180 of rotation. This allows for the rotational radius of rotating structure 104 to be changed when HAB 100 is put into service in space.

Figure 2:
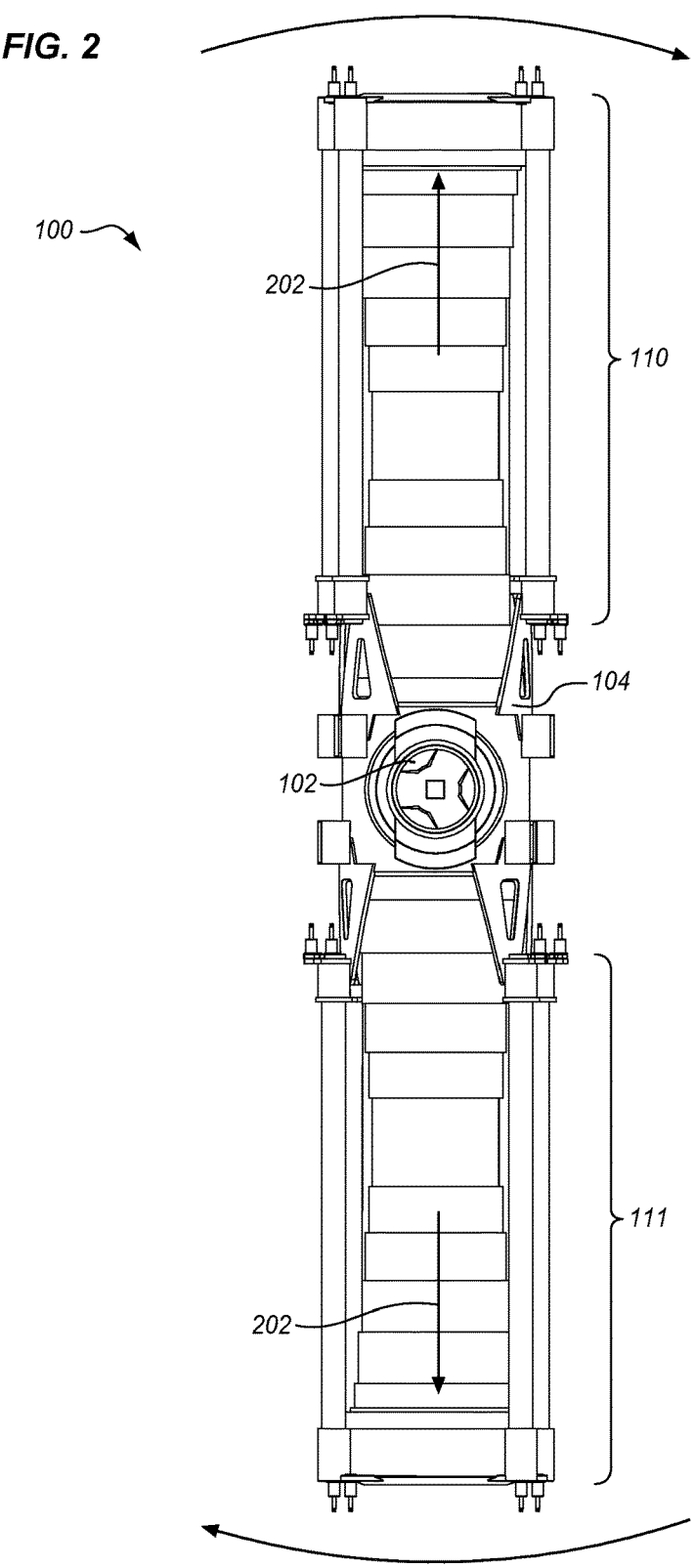
FIG. 2 is a side view of a habitation module in an exemplary embodiment.

FIG. 2 is a side view of HAB 100 in an exemplary embodiment. For the view in FIG. 2, axis 180 from FIG. 1 is into and out of the page. In the embodiments described below, rotating structure 104 is driven to spin in relation to stationary structure 102 about axis 180 (see also FIG. 1). The rotation about axis 180 creates a centrifugal force 202 on objects (e.g., crew members) inside of gravity chambers 110-111. The centrifugal force 202 feels like gravity to crew members inside of gravity chambers 110-111.

Figure 3:
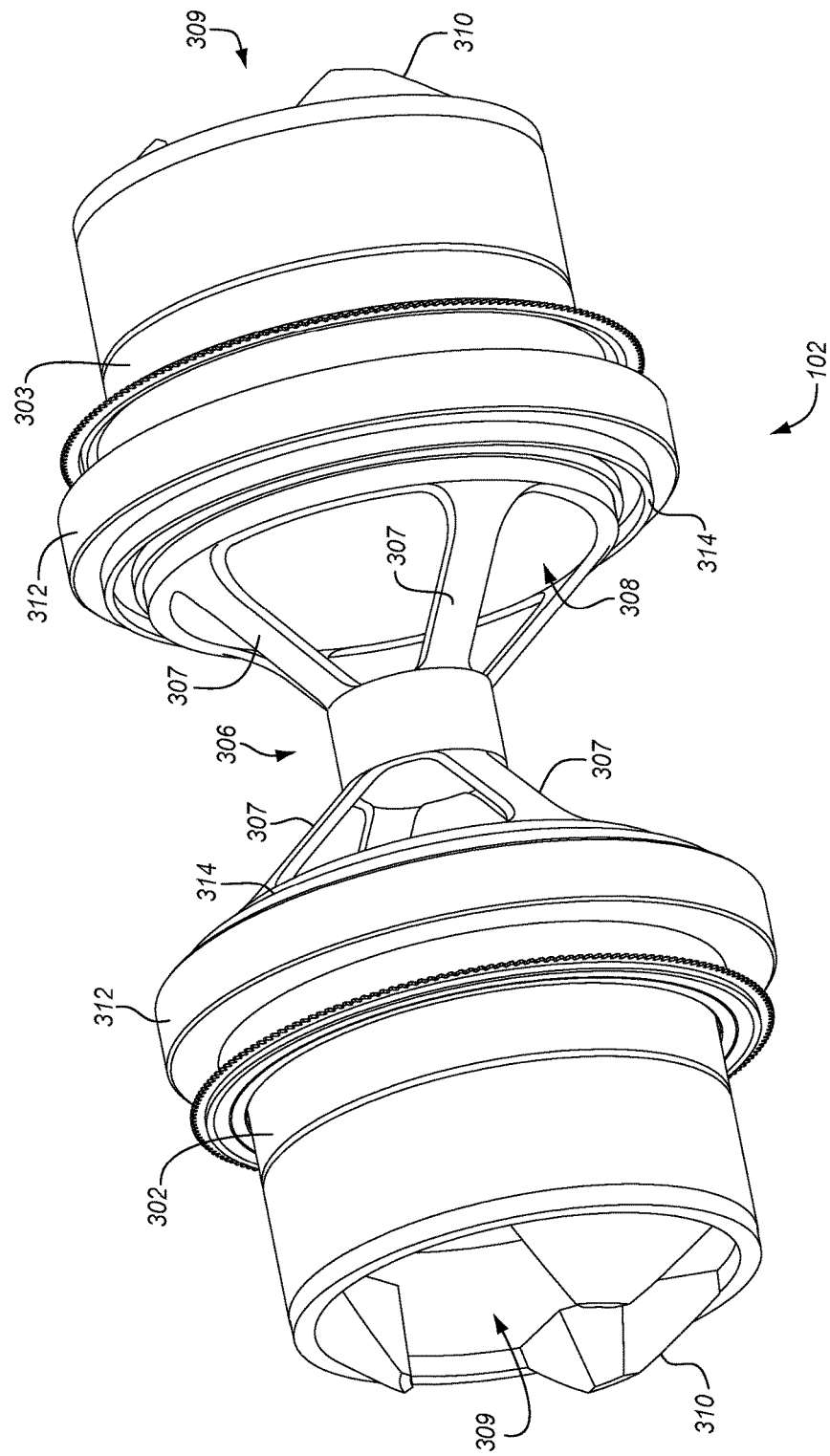
FIGS. 3-4 illustrate a stationary structure of a habitation module in an exemplary embodiment.
Figure 4:
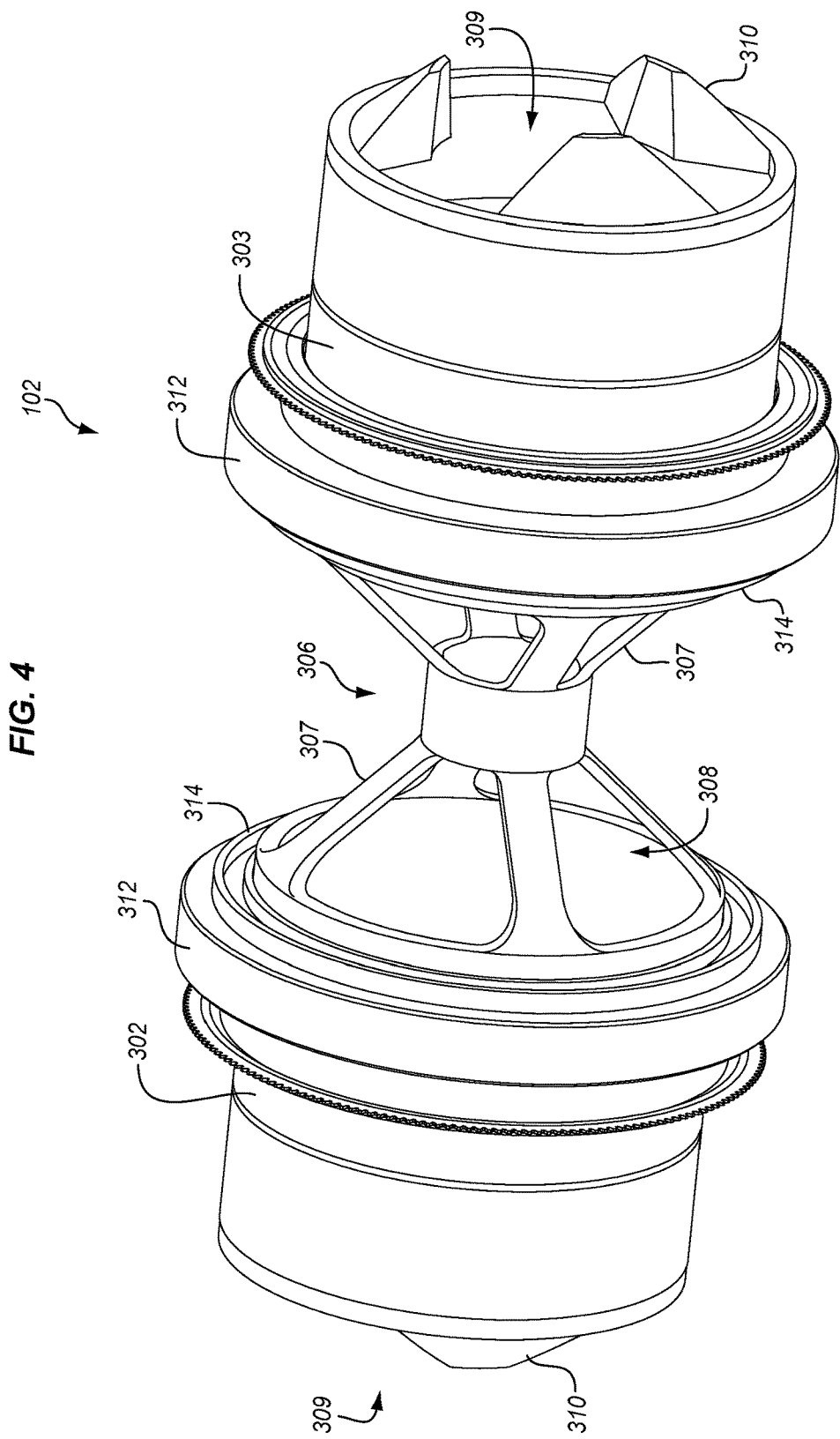

FIGS. 3-4 illustrate stationary structure 102 in an exemplary embodiment. Stationary structure 102 generally has a cylindrical profile so that rotating structure 104 can slide onto stationary structure 102 (see FIG. 1), and rotate around stationary structure 102. To create the cylindrical profile, stationary structure 102 includes body members 302-303 that are hollow, cylindrical members. Body members 302-303 are spaced apart and aligned co-axially with one another via support structure 306. Support structure 306 includes one or more support beams 307 that rigidly secure body members 302-303 to one another, and has gaps 308 between the support beams 307 that are sized so that a crew member may pass through body members 302-303 and support structure 306 to access gravity chambers 110-111. One or both of body members 302-303 may include a hatch 309 that may be opened by a crew member to pass through body members 302-303. One or both of body members 302-303 may include an active or passive docking mechanism 310 that encircles hatch 309. A docking mechanism (or berthing mechanism) 310 comprises any mechanism that forms an air-tight or pressure-tight seal between a body member 302-303 and another module, such as a module of a space station. This allows stationary structure 102 to be attached to a space station, and put into operation.

Figure 5:
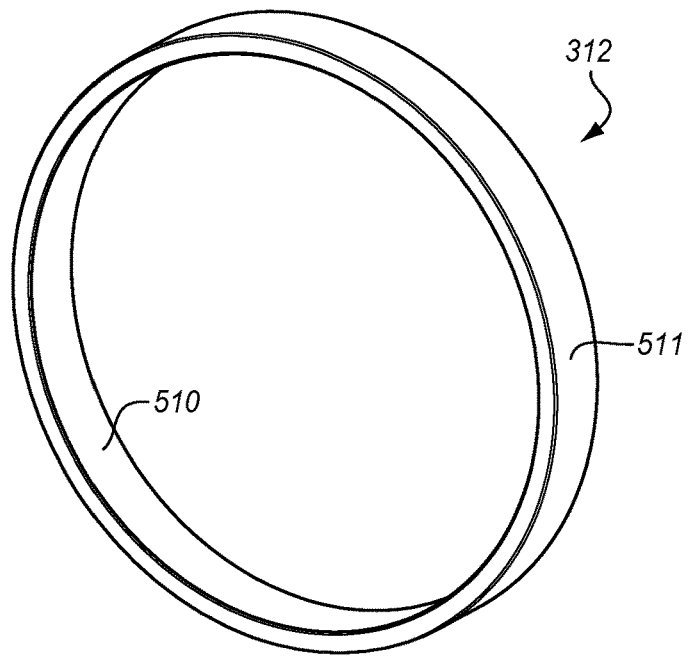
FIG. 5 illustrates a support bearing in an exemplary embodiment.

To allow rotating structure 104 to rotate in relation to stationary structure 102 (see FIG. 1), rotating structure 104 may attach to stationary structure 102 through rotatable attachment members. One example of rotatable attachment members are support bearings 312. Support bearings 312 are annular or ring-shaped, and are mounted on an outer surface of body members 302-303. FIG. 5 illustrates a support bearing 312 in an exemplary embodiment. Support bearing 312 includes an inner race (or ring) 510, an outer race (or ring) 511, and a rolling element between inner race 510 and outer race 511 that enables rotational movement (not visible in FIG. 5). The rolling element may comprise ball bearings, cylindrical rollers, or the like. Inner race 510 is configured to attach/mount to a body member 302-303 of stationary structure 102, while outer race 511 is configured to attach/mount to rotating structure 104.

Figure 6:
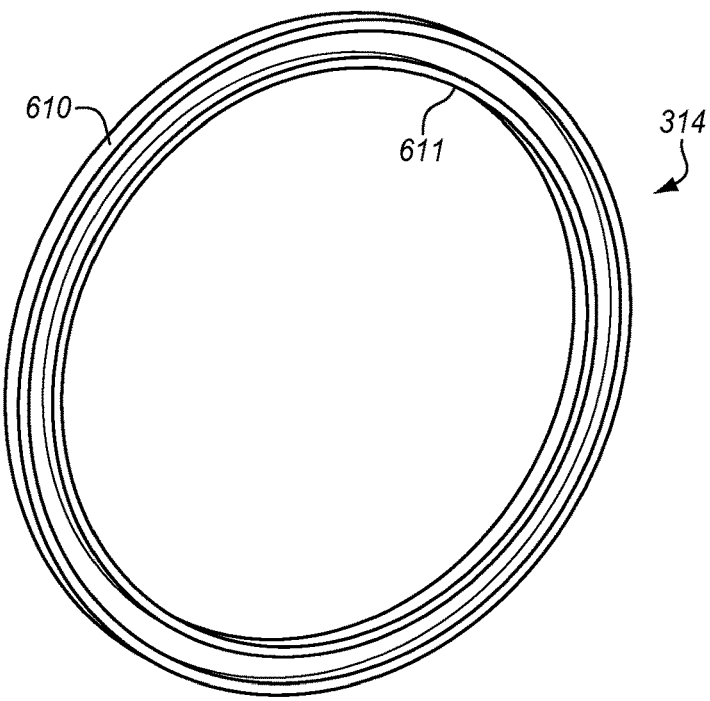
FIG. 6 illustrates a radial pressure seal in an exemplary embodiment.

Although rotating structure 104 is able to rotate in relation to stationary structure 102, the attachment point or juncture between rotating structure 104 and stationary structure 102 is sealed so that the interior of HAB 100 may be pressurized (e.g., to 1 atmosphere). Any gap or seam between rotating structure 104 and stationary structure 102 at their attachment point is sealed with one or more radial pressure seals 314. Radial pressure seals 314 are annular or ring-shaped seals that are mounted on an outer surface of body members 302-303. FIG. 6 illustrates radial pressure seal 314 in an exemplary embodiment. Radial pressure seal 314 includes an inner surface 611 that is configured to contact the outer surface of a body member 302-303, and an outer surface 610 that is configured to contact a surface of rotating structure 104 to form an air-tight or pressure-tight seal. A cross-section of radial pressure seal 314 may have any desired shape, such as rectangular, round, ribbed, etc.

Figure 7:
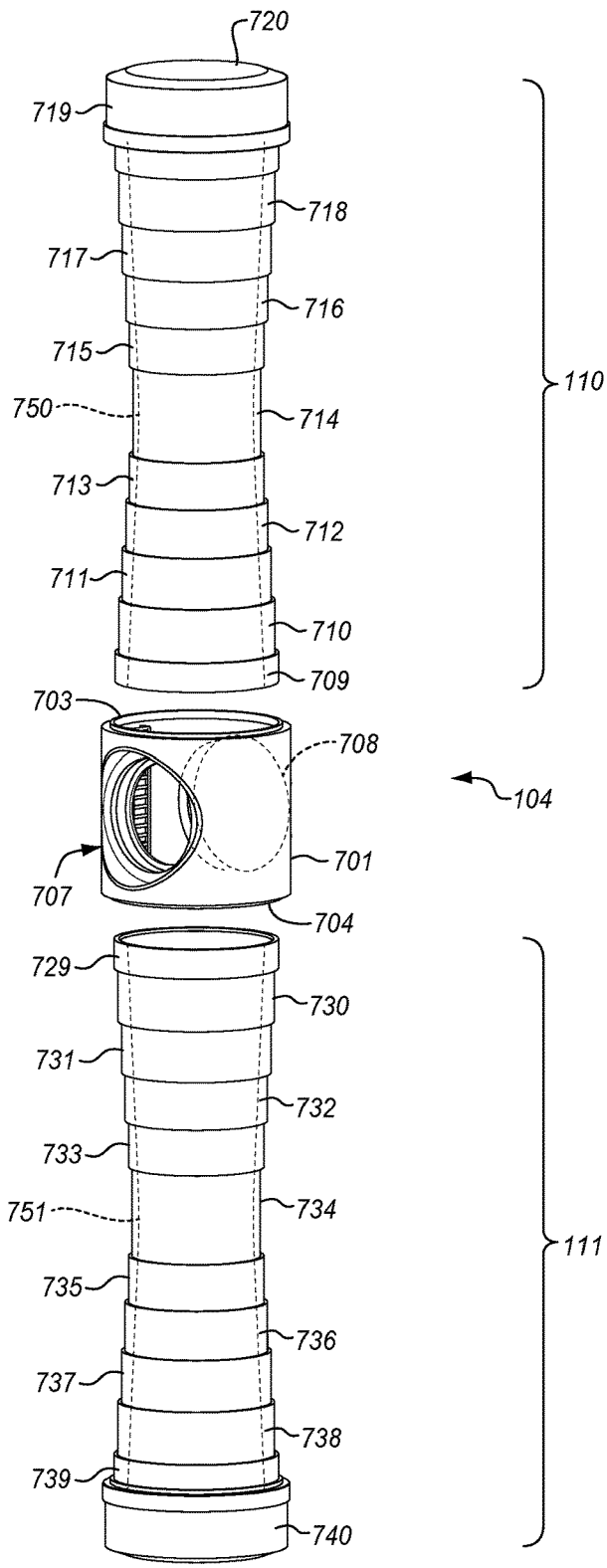
FIG. 7 is a partially exploded view of a rotating structure of a habitation module in an exemplary embodiment.

FIG. 7 is a partially exploded view of rotating structure 104 in an exemplary embodiment. In the portion of rotating structure 104 shown in FIG. 7, rotating structure 104 includes a hub member 701, gravity chamber 110, and gravity chamber 111. Hub member 701 is the element of rotating structure 104 that rotatably mounts to stationary member 102. In this embodiment, hub member 701 is a cylindrical body that is substantially hollow and open at its ends 703-704. Hub member 701 includes center apertures or openings 707-708 that are co-axially aligned on opposing sides of hub member 701 to define a cylindrical aperture through the center of hub member 701. Center openings 707-708 are transverse to the cylindrical shape of hub member 701 (i.e., transverse to the straight line axis of the cylindrical shape) and aligned along an axis of rotation of hub member 701 so that rotating structure 104 is able to slide onto stationary structure 102. Gravity chambers 110-111 attach to ends 703-704, respectively, of hub member 701. Gravity chamber 110 therefore projects radially from end 703 of hub member 701, and gravity chamber 111 projects radially from end 704 of hub member 701 in opposing directions.

Gravity chamber 110 is an extendible structure that attaches to hub member 701, and is shown as extended in FIG. 7. Gravity chamber 110 includes a base member 709, a plurality of ring members 710-718 that form the side wall (i.e., the cylindrical side wall) of gravity chamber 110, and an end member 719. Base member 709 is an annular structure that is attached, connected, or otherwise affixed to end 703 of hub member 701, and represents the entry point for a crew member into gravity chamber 110. The attachment point between base member 709 and hub member 701 is sealed. For example, the rim on one end of base member 709 may be welded around the opening of end 703 to permanently affix base member 709 to hub member 701. End member 719 is a cylindrical structure that is open at one end and closed on the other end by an end wall 720. End member 719 is the cap for gravity chamber 110, and is the element of gravity chamber 110 at the furthest radial distance from the axis 180 of rotation of rotating member 104. End wall 720 of end member 719 serves as the floor of gravity chamber 110. End wall 720 may be lined with a rubber, padding, or any other material that protects crew members inside of gravity chamber 110, and may include an emergency hatch (not shown in FIG. 7). Base member 709 and end member 719 may be made from a thin metal (e.g., aluminum), a composite material, a plastic, or another type of rigid material.

Ring members 710-718 comprise the structure that connects between base member 709 and end member 719. Ring members 710-718 each comprise a rigid annular structure or rigid shell that is formed from a material, such as aluminum to protect from micro meteoroid and other space debris. Although the individual ring members 710-718 are rigid, the arrangement of ring members 710-718 is a concentric structure where ring members 710-718 are designed to slide into one another so that the side wall of gravity chamber 110 radially extends and contracts. In this embodiment, ring member 714 has the smallest diameter among ring members 710-718. In the series of ring members 710-718 connected or chained together between base member 709 and end member 719, ring member 714 is located toward the middle of the series, and may be referred to as a middle ring member. Ring members 710-713 between ring member 714 and base member 709 have a successively increasing diameter, and ring members 715-718 between ring member 714 and end member 719 have a successively increasing diameter. For example, between ring member 714 and base member 709, ring member 713 has a larger diameter than ring member 714, and is able to slide over ring member 714. Ring member 712 has a larger diameter than ring member 713, and is able to slide over ring member 713. Ring member 711 has a larger diameter than ring member 712, and is able to slide over ring member 712. Ring member 710 has a larger diameter than ring member 711, and is able to slide over ring member 711. Base member 709 has a larger diameter than ring member 710, and is able to slide over ring member 710. Between ring member 714 and end member 719, ring member 715 has a larger diameter than ring member 714, and is able to slide over ring member 714. Ring member 716 has a larger diameter than ring member 715, and is able to slide over ring member 715. Ring member 717 has a larger diameter than ring member 716, and is able to slide over ring member 716. Ring member 718 has a larger diameter than ring member 717, and is able to slide over ring member 717. End member 719 has a larger diameter than ring member 718, and is able to slide over ring member 718. Because of the concentric design of ring members 710-718, gravity chamber 110 is telescopic and is able to radially extend and contract.

Gravity chamber 111 is also an extendible structure that attaches to hub member 701, and is shown as extended in FIG. 7. Gravity chamber 111 includes a base member 729, a plurality of ring members 730-738 that form the side wall (i.e., the cylindrical side wall) of gravity chamber 111, and an end member 739. Base member 729 is an annular structure that is attached, connected, or otherwise affixed to end 704 of hub member 701, and represents the entry point for a crew member into gravity chamber 111. The attachment point between base member 729 and hub member 701 is sealed. For example, the rim on one end of base member 729 may be welded around the opening of end 704 to permanently affix base member 729 to hub member 701. End member 739 is a cylindrical structure that is open at one end and closed on the other end by an end wall 740. End member 739 is the cap for gravity chamber 111, and is the element of gravity chamber 111 at the furthest radial distance from the axis 180 of rotation of rotating member 104. End wall 740 of end member 739 serves as the floor of gravity chamber 111. End wall 740 may be lined with a rubber, padding, or any other material that protects crew members inside of gravity chamber 111, and may include an emergency hatch (not shown in FIG. 7).

Ring members 730-738 comprise the structure that connects between base member 729 and end member 739. Ring members 730-738 each comprise a rigid annular structure or rigid shell that is formed from a material, such as aluminum to protect from micro meteoroid and other space debris. Although the individual ring members 730-738 are rigid, the arrangement of ring members 730-738 is a concentric structure where ring members 730-738 are designed to slide into one another so that the side wall of gravity chamber 111 radially extends and contracts. In this embodiment, ring member 734 has the smallest diameter among ring members 730-738. In the series of ring members 730-738 connected or chained together between base member 729 and end member 739, ring member 734 is located toward the middle of the series, and may be referred to as a middle ring member. Ring members 730-733 between ring member 734 and base member 729 have a successively increasing diameter, and ring members 735-738 between ring member 734 and end member 739 have a successively increasing diameter. For example, between ring member 734 and base member 729, ring member 733 has a larger diameter than ring member 734, and is able to slide over ring member 734. Ring member 732 has a larger diameter than ring member 733, and is able to slide over ring member 733. Ring member 731 has a larger diameter than ring member 732, and is able to slide over ring member 732. Ring member 730 has a larger diameter than ring member 731, and is able to slide over ring member 731. Base member 729 has a larger diameter than ring member 730, and is able to slide over ring member 730. Between ring member 734 and end member 739, ring member 735 has a larger diameter than ring member 734, and is able to slide over ring member 734. Ring member 736 has a larger diameter than ring member 735, and is able to slide over ring member 735. Ring member 737 has a larger diameter than ring member 736, and is able to slide over ring member 736. Ring member 738 has a larger diameter than ring member 737, and is able to slide over ring member 737. End member 739 has a larger diameter than ring member 738, and is able to slide over ring member 738. Because of the concentric design of ring members 730-738, gravity chamber 111 is telescopic and is able to radially extend and contract.

Figure 8:
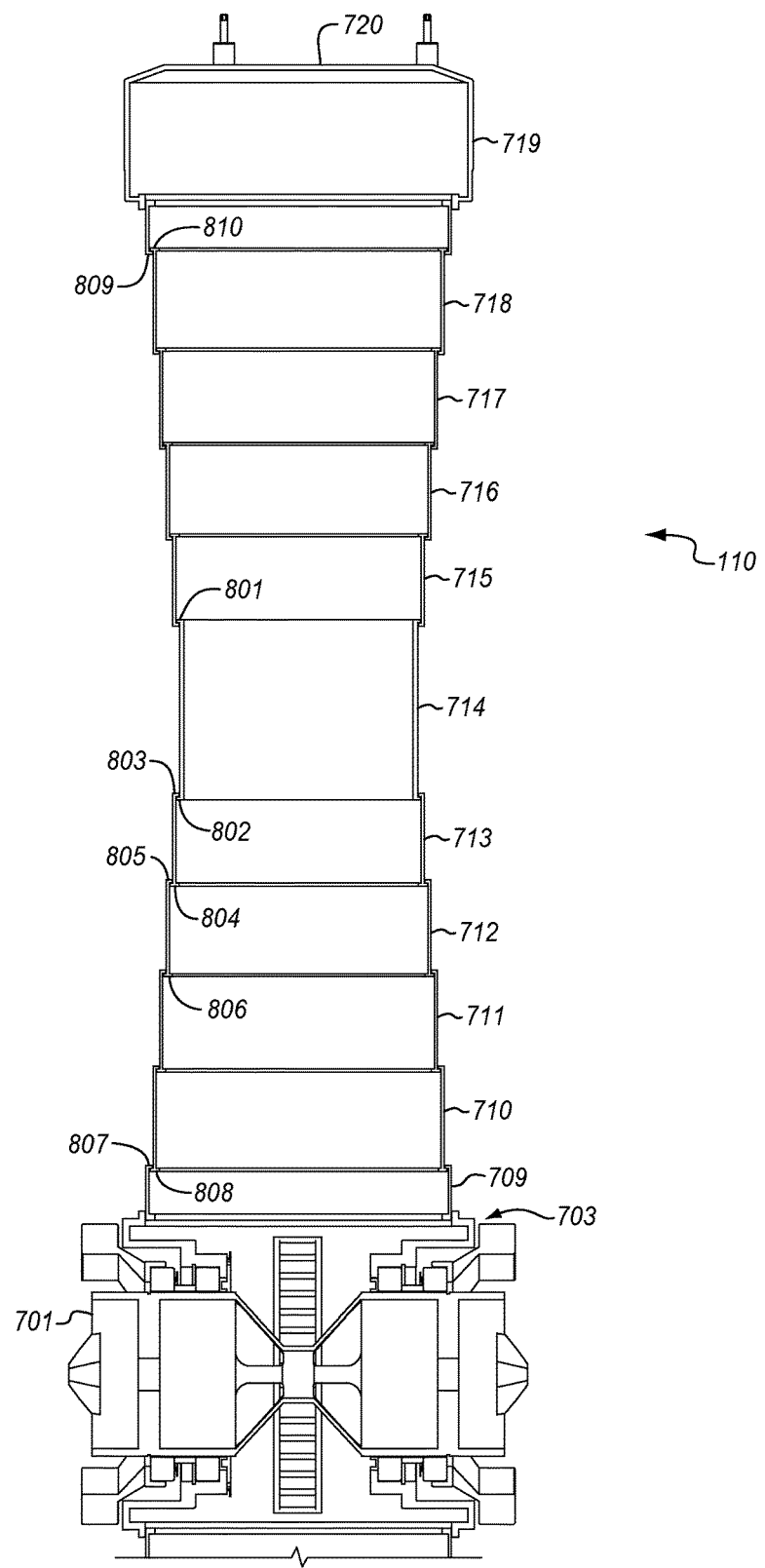
FIG. 8 is a cross-sectional view of a gravity chamber in an exemplary embodiment.

FIG. 8 is a cross-sectional view of gravity chamber 110 in an exemplary embodiment. The cross-section in FIG. 8 is substantially through the center of gravity chamber 110. Each of the ring members 710-718 includes one or more projected edges or protrusions that engage with a neighboring ring member 710-718. A projected edge is referred to herein as a flange that is formed at least partially around a ring member. For instance, ring member 714 includes flanges 801-802, which protrude outward proximate to opposing ends of ring member 714. Ring member 713 includes flanges 803-804, where flange 803 protrudes inward proximate to one end of ring member 713, and flange 804 protrudes outward proximate to the opposing end of ring member 713. Ring member 712 includes flanges 805-806, where flange 805 protrudes inward proximate to one end of ring member 712, and flange 806 protrudes outward proximate to the opposing end of ring member 712. Flange 802 of ring member 714 is configured to engage with flange 803 of ring member 713 when gravity chamber 110 is extended. Likewise, flange 804 of ring member 713 is configured to engage with flange 805 of ring member 712 when gravity chamber 110 is extended. Although not specifically labeled in FIG. 8, each ring member 710-718 includes one or more flanges, such as illustrated in FIG. 8, to engage with a flange of a neighboring ring member. Additionally, base member 709 includes flange 807, which protrudes inward proximate to an end of base member 709. Flange 807 is configured to engage with a flange 808 of ring member 710. End member 719 includes flange 809, which protrudes inward proximate to an end of end member 719. Flange 809 is configured to engage with a flange 810 of ring member 718. Ring members 730-738 include flanges similar to ring members 710-718 of gravity chamber 110.

The arrangement of ring members 710-718 and 730-738 in FIG. 7 illustrates one embodiment. In another embodiment, the ring member having the smallest diameter may engage with base member 709, and the diameters of the ring members between base member 709 and end member 719 may get successively larger. In another embodiment, the ring member having the largest diameter may engage with base member 709, and the diameters of the ring members between base member 709 and end member 719 may get successively smaller. In each embodiment, the ring members are concentric structures that are able to slide into one another so that the length of a gravity chamber is able to extend and contract.

In FIG. 7, rotating structure 104 also includes seal elements 750-751. Seal elements 750-751 are formed from a flexible or pliable material, and are configured to provide an air-tight seal to the ring members 710-718 and 730-738 of gravity chambers 110-111. In this embodiment, seal element 750 is a single tubular body or a plurality of tubular bodies that extend through an interior of gravity chamber 110. Even though ring members 710-718 engage with one another when gravity chamber 110 is extended, the connection points between ring members 710-718 may not be air tight. Thus, seal element 750 is installed inside of ring members 710-718 to create an air-tight cavity within the interior of gravity chamber 110 (i.e., between base member 709 and end member 719). Seal element 751 is a single tubular body or a plurality of tubular bodies that extend through an interior of gravity chamber 111. Even though ring members 730-738 engage with one another when gravity chamber 111 is extended, the connection points between ring members 730-738 may not be air tight. Thus, seal element 751 is installed inside of ring members 730-738 to create an air-tight cavity within the interior of gravity chamber 111 (i.e., between base member 729 and end member 739).

Figure 9A:
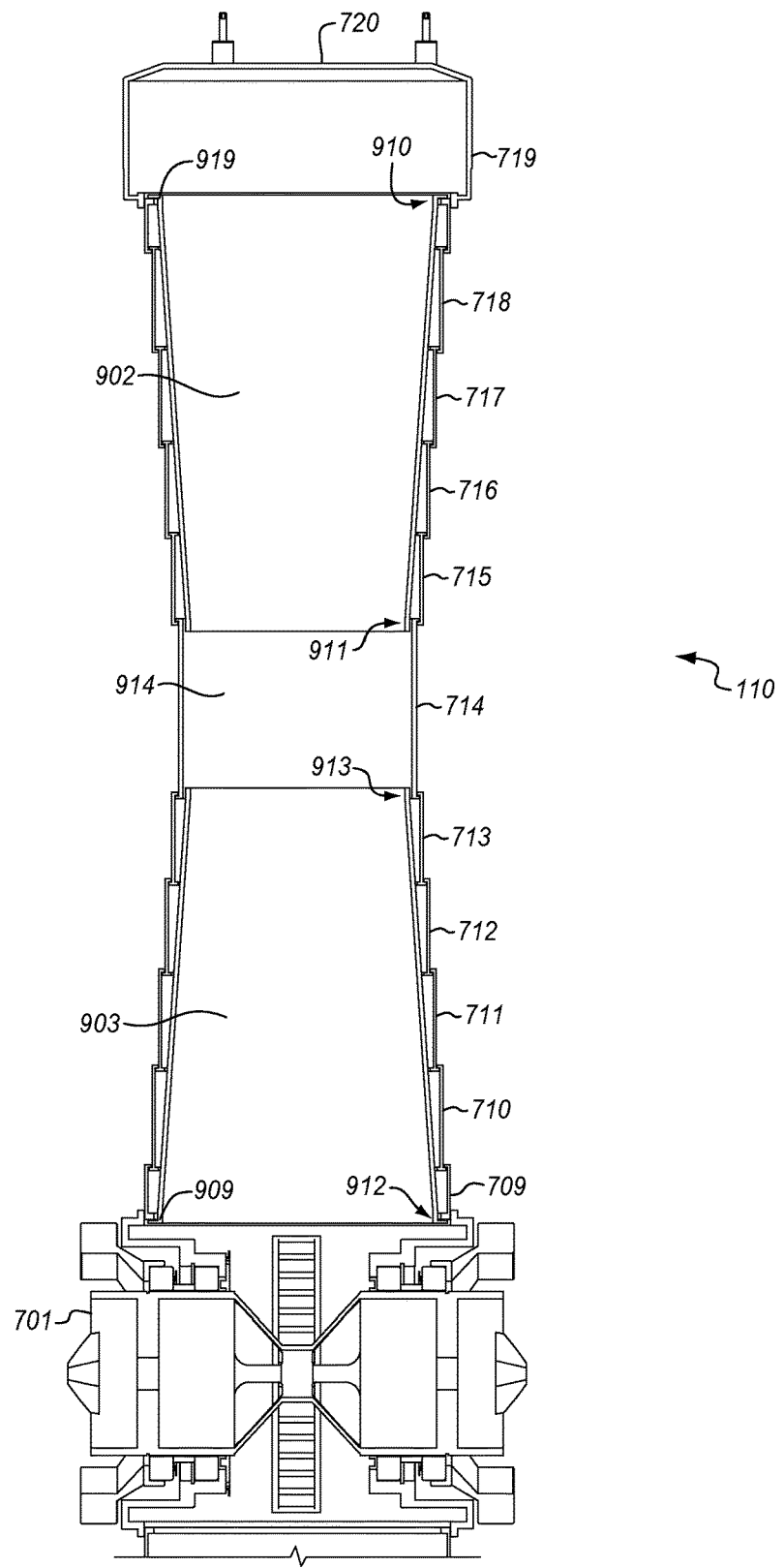

The design of seal elements 750-751 may vary in different embodiments, one of which is illustrated in FIGS. 9A-9B. FIG. 9A is a cross-sectional view of gravity chamber 110 in an extended configuration in an exemplary embodiment. In this embodiment, seal element 750 comprises tubular seals 902-903 that are installed in gravity chamber 110 to seal the interior of gravity chamber 110. Tubular seals 902-903 are elongated round hollow members made from a material that is flexible or pliable yet air tight. One example of the material for tubular seals 902-903 is a rubber material, such as an Ethylene Propylene Diene monomer rubber. Tubular seals 902-903 are affixed inside of ring members 710-718 to provide an air-tight seal within gravity chamber 110.

In this embodiment, one end 910 of tubular seal 902 is affixed around an inner surface 919 of end member 719, and the other end 911 of tubular seal 902 is affixed around an inner surface 914 of ring member 714. For example, end 910 of tubular seal 902 may be vulcanized around the circumference of the inner surface 919 of end member 719, and end 911 of tubular seal 902 may be vulcanized around the circumference of the inner surface 914 of ring member 714. Similarly, one end 912 of tubular seal 903 is affixed around an inner surface 909 of base member 709, and the other end 913 of tubular seal 903 is affixed around the inner surface 914 of ring member 714. Because of how tubular seals 902-903 are installed, there is an air-tight cavity formed within gravity chamber 110 between base member 709 and end member 719. Additionally, the attachment point between base member 709 and hub member 701 is sealed (e.g., welded) so that gravity chamber 110 may be pressurized. Thus, even though ring members 710-718 may not be air-tight with respect to one another when gravity chamber 110 is extended, tubular seals 902-903 enclose the volume within ring members 710-718 so that gravity chamber 110 may be pressurized.

FIG. 9B is a cross-sectional view of gravity chamber 110 in a contracted configuration in an exemplary embodiment. Because tubular seals 902-903 are made from a flexible material, tubular seals 902-903 are able to fold within the interior of gravity chamber 110 when gravity chamber 110 is contracted.

The number of tubular seals, the attachment points for the tubular seals, etc., is a matter of design choice and FIGS. 9A-9B illustrate one example. For example, one tubular seal may extend between base member 710 and end member 719. Gravity chamber 111 may include one or more tubular seals substantially as described for gravity chamber 110.

Figure 10:
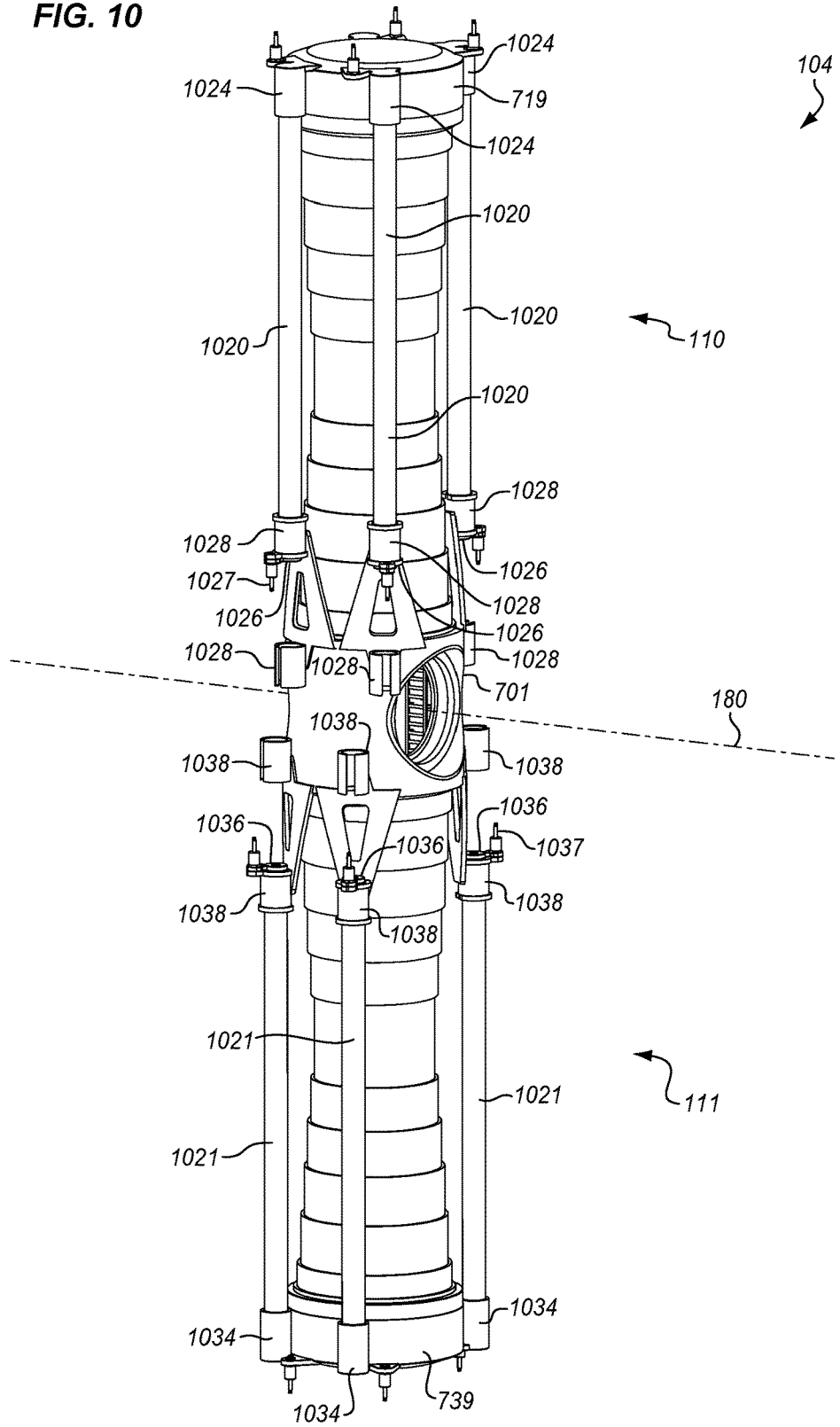
FIG. 10 is an isometric view of a rotating structure of a habitation module in an extended configuration in an exemplary embodiment.

FIG. 10 is an isometric view of rotating structure 104 in an extended configuration in an exemplary embodiment. In this embodiment, rotating structure 104 also includes extension rods 1020-1021. Extension rods 1020 are configured to guide end member 719 of gravity chamber 110 when it extends radially from axis 180. One end 1024 of each extension rod 1020 is affixed to end member 719 (via a weld, bolts, etc.), and the other end 1026 of each extension rod 1020 is unattached and slides through a guide ring 1028 that is affixed to hub member 701. When gravity chamber 110 is extended, end 1026 of each extension rod 1020 may be secured to a guide ring 1028 to lock it in place, such as with a safety lock 1027 (e.g., a bolt).

Extension rods 1021 are configured to guide end member 739 of gravity chamber 111 when it extends radially from axis 180. One end 1034 of each extension rod 1021 is affixed to end member 739 (via a weld, bolts, etc.), and the other end 1036 of each extension rod 1021 is unattached and slides through a guide ring 1038 that is affixed to hub member 701. When gravity chamber 111 is extended, end 1036 of each extension rod 1021 may be secured to a guide ring 1038 to lock it in place, such as with a safety lock 1037.

Figure 11:
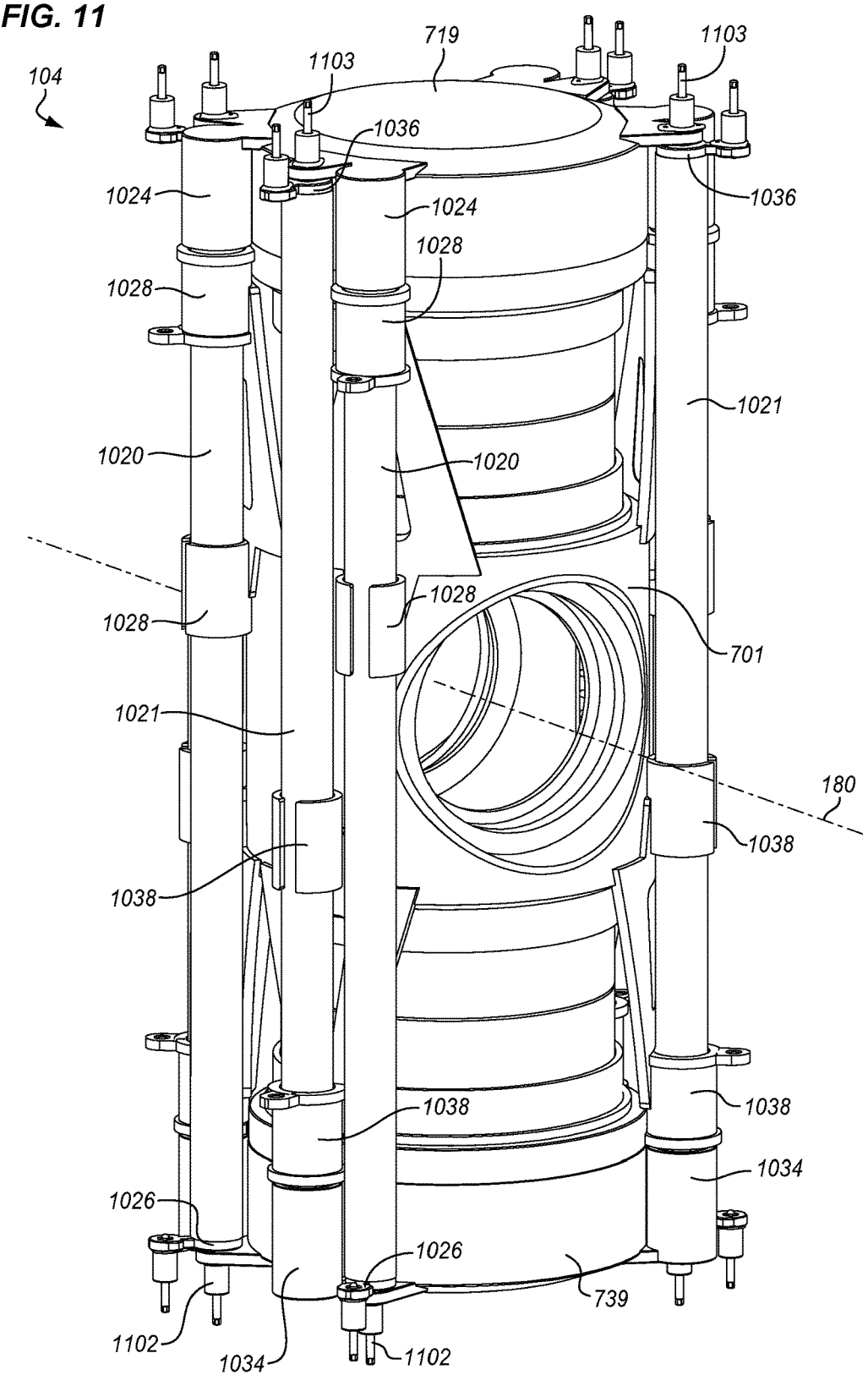
FIG. 11 is an isometric view of a rotating structure of a habitation module in a contracted configuration in an exemplary embodiment.

FIG. 11 is an isometric view of rotating structure 104 in a contracted configuration in an exemplary embodiment. When contracted, extension rods 1020 slide through guide rings 1028 until end 1026 is proximate to a launch lock 1102 (e.g., a bolt) on end member 739 of gravity chamber 111. Launch lock 1102 is configured to secure end 1026 of extension rods 1020 when gravity chamber 110 is contracted. Also, extension rods 1021 slide through guide rings 1038 until end 1036 is proximate to a launch lock 1103 on end member 719 of gravity chamber 110. Launch lock 1103 is configured to secure end 1036 of extension rods 1021 when gravity chamber 111 is contracted.

The structure of the extension rods 1020-1021 for HAB 100 as shown in FIG. 10-11 illustrates one embodiment, but the extension rods may have different structures to provide support to end members 719 and 739 as they are extended in the radial direction.

Figure 12:
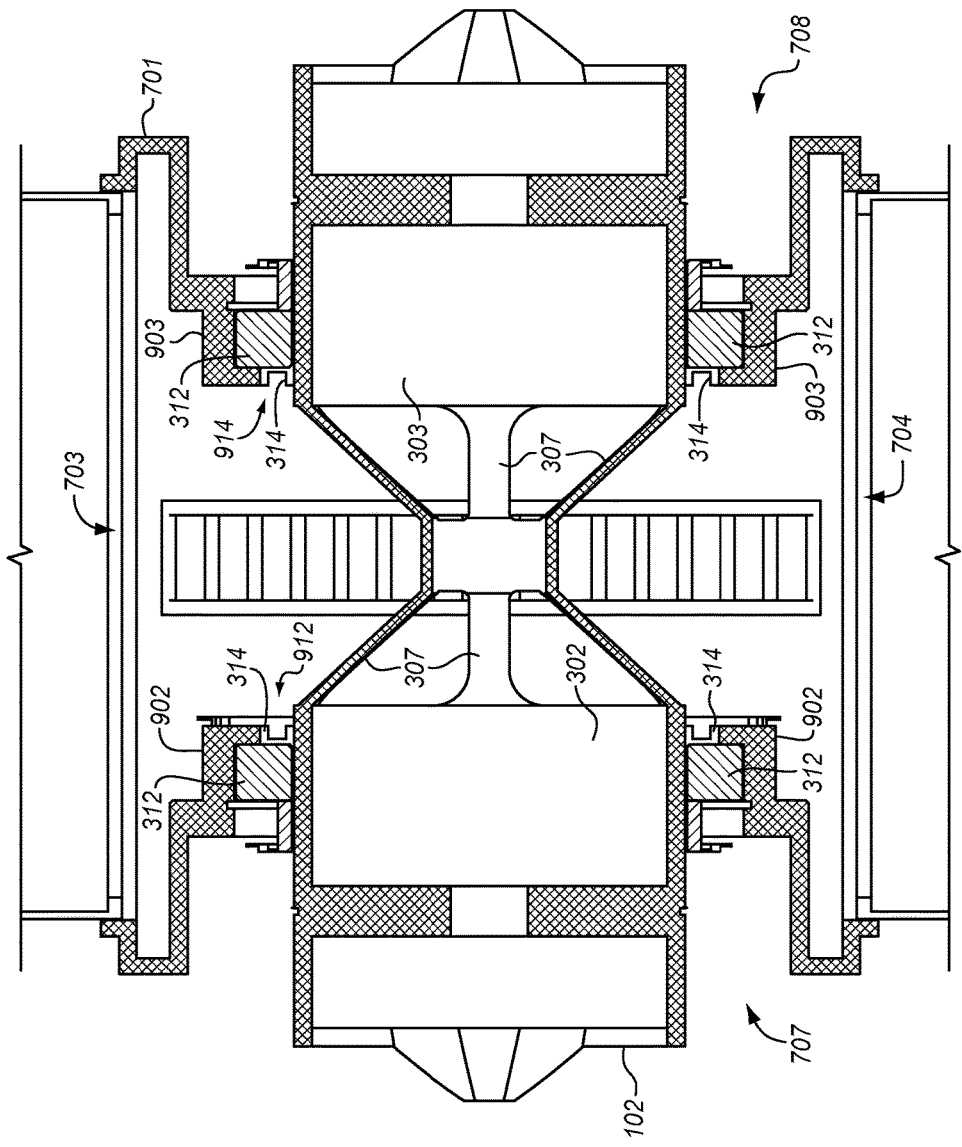
FIG. 12 is a cross-sectional view of a hub member and a stationary structure in an exemplary embodiment.

When HAB 100 is assembled as shown in FIG. 1, hub member 701 of rotating structure 104 is slid onto stationary structure 102. Hub member 701 is then attached to stationary structure 102 via rotatable attachment members, such as support bearings 312 (see FIGS. 3-4). To further illustrate an exemplary attachment of hub member 701 to stationary structure 102, FIG. 12 is a cross-sectional view of hub member 701 and stationary structure 102 in an exemplary embodiment. Again in this embodiment, the rotatable attachment members comprise support bearings 312 that mount to an outer surface of body members 302-303. Hub member 701 includes bearing housings 902-903. The outer race 511 (see FIG. 5) of a support bearing 312 is mounted to bearing housing 902, while the inner race 510 of the support bearing 312 is mounted on the outer surface of body member 302. The outer race 511 (see FIG. 5) of another support bearing 312 is mounted to bearing housing 903, while the inner race 510 of the support bearing 312 is mounted on the outer surface of body member 303. Thus, one support bearing 312 is mounted between body member 302 and bearing housing 902, and another support bearing 312 is mounted between body member 303 and bearing housing 903. The inner races 510 of the support bearings 312 are held stationary by body members 302-303, while hub member 701 is allowed to rotate on the outer races 511 of the support bearings 312.

Although hub member 701 is able to rotate in relation to stationary structure 102, the attachment point or juncture between hub member 701 and stationary structure 102 is sealed so that the interior of HAB 100 may be pressurized. To accomplish this, a radial pressure seal 314 is mounted between the outer surface of body member 302 and bearing housing 902, and spans a gap 912 between body member 302 and bearing housing 902. Thus, there is an air-tight seal between body member 302 and bearing housing 902. Similarly, a radial pressure seal 314 is mounted between the outer surface of body member 303 and bearing housing 903, and spans a gap 914 between body member 303 and bearing housing 903. Thus, there is an air-tight seal between body member 303 and bearing housing 903. In this embodiment, radial pressure seals 314 may be mounted between a support bearing 312 and an interior of hub member 701 so that the radial pressure seals 314 may be inspected and/or replaced.

Figure 13:
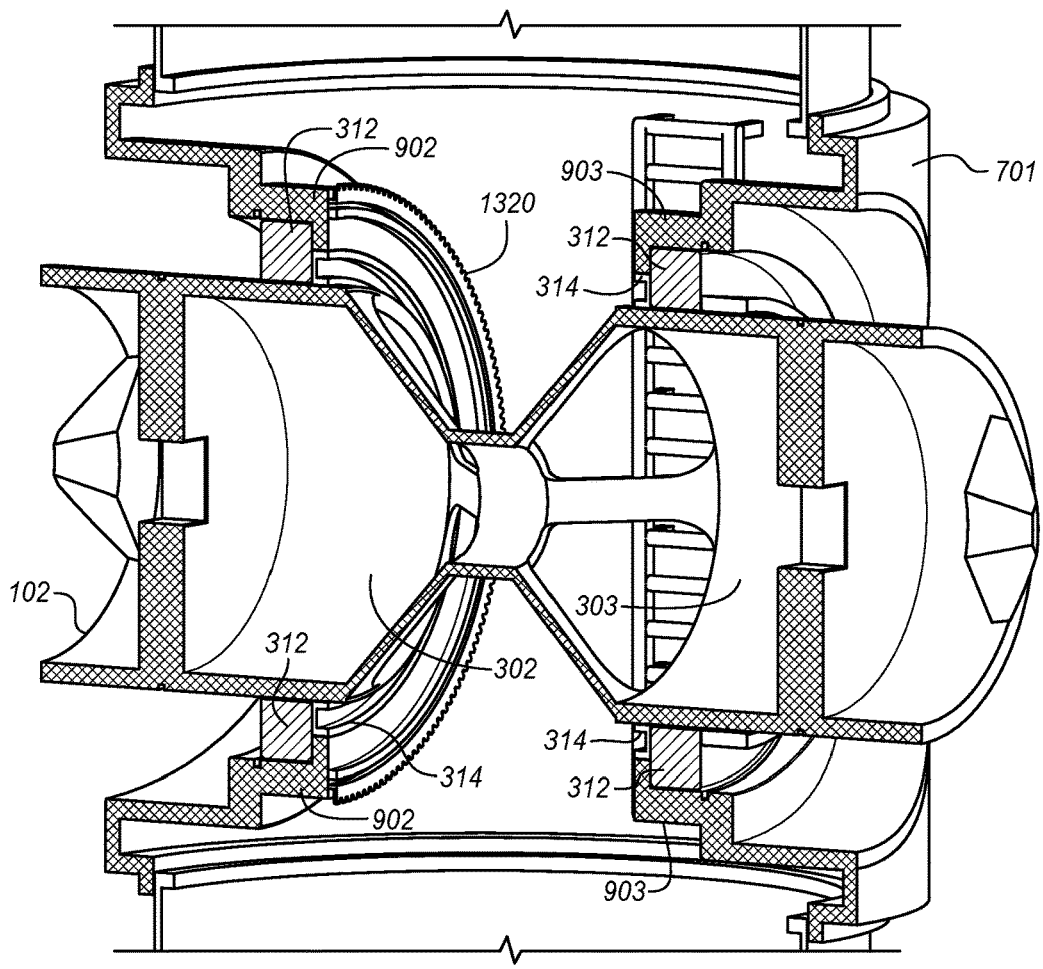
FIG. 13 is an isometric cross-sectional view of a hub member and a stationary structure in an exemplary embodiment.
Figure 14:
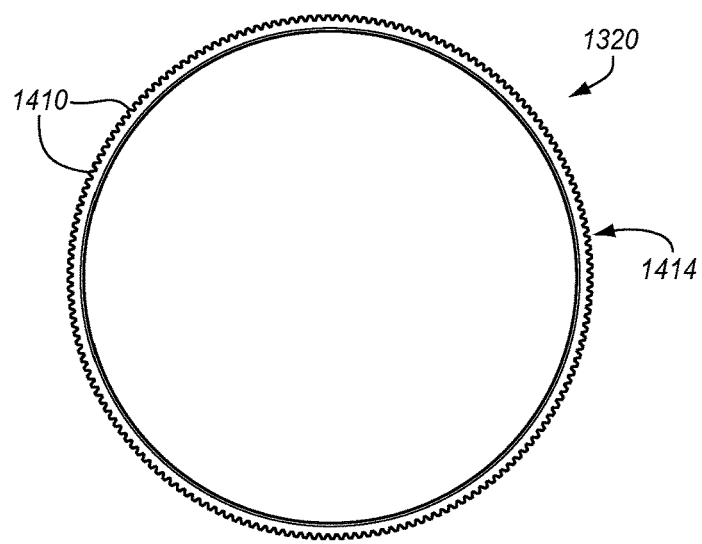
FIG. 14 illustrates a ring gear in an exemplary embodiment.

To spin hub member 701 (and consequently rotating structure 104) around stationary structure 102, a ring gear may be affixed to hub member 701 to mate with a drive mechanism. FIG. 13 is an isometric cross-sectional view of hub member 701 and stationary structure 102 in an exemplary embodiment. In this embodiment, a ring gear 1320 is affixed to bearing housing 902 to impart rotation to rotating structure 104. FIG. 14 illustrates ring gear 1320 in an exemplary embodiment. In this embodiment, ring gear 1320 includes a plurality of teeth 1410 on an outer surface 1414 for meshing with a drive gear of a drive mechanism of HAB 100. Ring gear 1320 may bolt or otherwise attach to bearing housing 902 or another structure of hub member 701. Although one ring gear 1320 is illustrated in FIG. 13, a ring gear 1320 may be affixed to bearing housing 903 to drive rotating structure 104 from both sides.

When rotating structure 104 is slid onto stationary structure 102 as shown in FIG. 1 and attached via support bearings 312, radial pressure seals 314 create an air-tight or pressure-tight seal between hub member 701 and stationary structure 102. Also, seal elements 750-751 in gravity chambers 110-111 create an air-tight or pressure-tight seal within gravity chambers 110-111. Therefore, the interior of rotating structure 104 may be pressurized, and a drive mechanism can impart rotation movement to rotating structure 104 about axis 180. Crew members may access gravity chambers 110-111 to experience an artificial gravity environment. As rotating structure 104 rotates about axis 180 (see FIG. 2), the centrifugal force 202 created will pull a crew member towards end walls 720 and 740, which comprise the floor of gravity chambers 110-111, respectively. The amount of force on an object depends on the angular velocity of rotation and the distance of the object from the axis of rotation. Although the dimensions of rotating structure 104 may vary as desired, the distance of end walls 720 and 740 of rotating structure 104 may be about 11 meters from axis 180.

When inside of gravity chamber 110, for example, a crew member will experience the artificial gravity environment created by rotation of rotating structure 104 about axis 180. The force created by rotation of rotating structure 104 about axis 180 pushes the crew member against end wall 720, which feels like gravity. That way, the crew member may sleep, exercise, etc., within gravity chamber 110 in an artificial gravity environment, which has health benefits such as reduced muscle and bone degeneration. Also, when in use, the interior of rotating structure 104 is pressurized and temperature-controlled so that a crew member does not need to wear a specialize suit. Even though rotating structure 104 rotates in relation to stationary structure 102, the attachment points between rotating structure 104 and stationary structure 102 are sealed so that an oxygen-supplied and thermally-controlled environment is created within the interior of rotating structure 104. The pressurized and thermally-controlled environment is also advantageous as the drive mechanism is readily accessible for replacement or repair, and bearings 312 and seals 314 are accessible for service.

Figure 15:
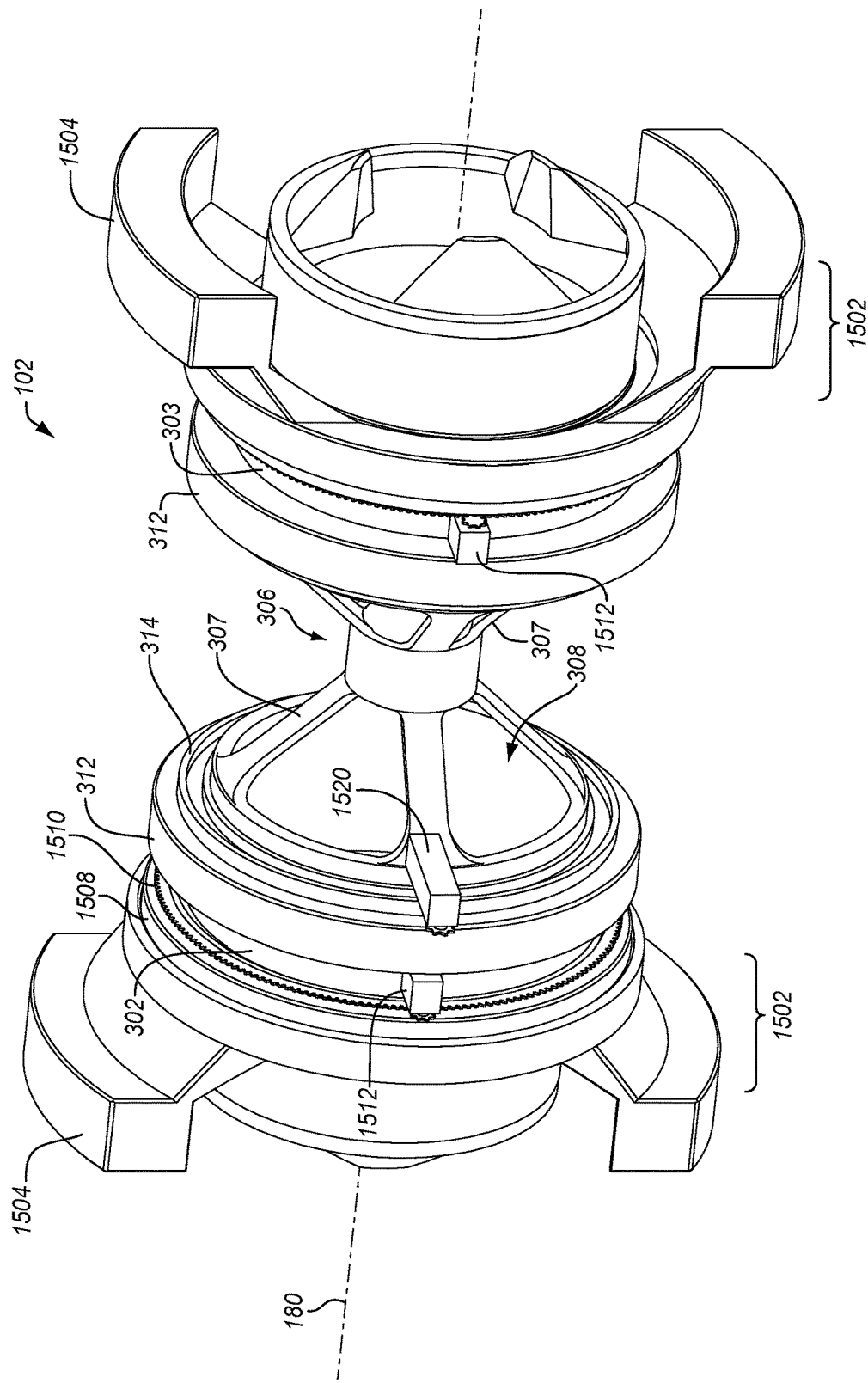
FIG. 15 is an isometric view of a stationary structure illustrating a counter-rotating mechanism in an exemplary embodiment.

The rotation of rotating structure 104 may create an unwanted momentum for HAB 100. To cancel out the unwanted momentum, a counter-rotating mechanism may be installed to rotate about axis 180 in an opposite direction than rotating structure 104. FIG. 15 is an isometric view of stationary structure 102 illustrating a counter-rotating mechanism 1502 in an exemplary embodiment. Counter-rotating mechanism 1502 is installed on stationary structure 102. In this embodiment, counter-rotating mechanism 1502 includes a counter-weight 1504 that is driven by a drive mechanism 1512 to rotate in the opposite direction of rotating structure 104 about axis 180 to negate momentum created by rotation of rotating structure 104. Counter-weight 1504 may be segmented into opposing weights, or may comprise a continuous structure. Counter-rotating mechanism 1502 may be installed on both sides of stationary structure 102. On either side of stationary structure 102, counter-weight 1504 may be mounted on an outer surface of body member 302/303 of stationary structure 102 via a support bearing 1508. Support bearings 1508 may be ring-shaped as described above for support bearings 312.

Support bearings 1508 also include teeth 1510 that mesh with a drive gear of drive mechanism 1512 so that drive mechanism 1512 can impart rotational movement to counter-weight 1504 in an opposite direction than rotating structure 104. Momentum is measured in mass multiplied by velocity (rotational). If it is assumed that the mass of counter-weight 1504 is fixed, then counter-weight 1504 is driven at a speed to compensate for the momentum created by rotation of rotating structure 104. If the mass of rotating structure 104 changes (e.g., crew members enter one of gravity chambers 110-111), then drive mechanism 1512 adjusts the rotational speed of counter-weight 1504 to compensate for the change in mass. The rotational speed of counter-weight 1504 is therefore adjusted so that there is a net-zero momentum change due to rotation of rotating structure 104.

FIG. 15 also illustrates drive mechanism 1520 for turning rotating structure 104. Drive mechanism 1520 is placed proximate or adjacent to ring gear 1320, which is part of rotating structure 104 (see FIG. 13), and is configured to spin a drive gear to impart rotational movement to ring gear 1320. Teeth on the drive gear of drive mechanism 1520 mesh with teeth 1410 of ring gear 1320 (see FIG. 14). When drive mechanism 1520, which is part of stationary structure 102, turns its drive gear, it imparts rotational movement on rotating structure 104 about axis 180 (see FIG. 1). Drive mechanism 1520 may comprise an electric motor, a hydraulic motor, a pneumatic motor, or any other actuating device that has a variable rotational speed.

Figure 16:
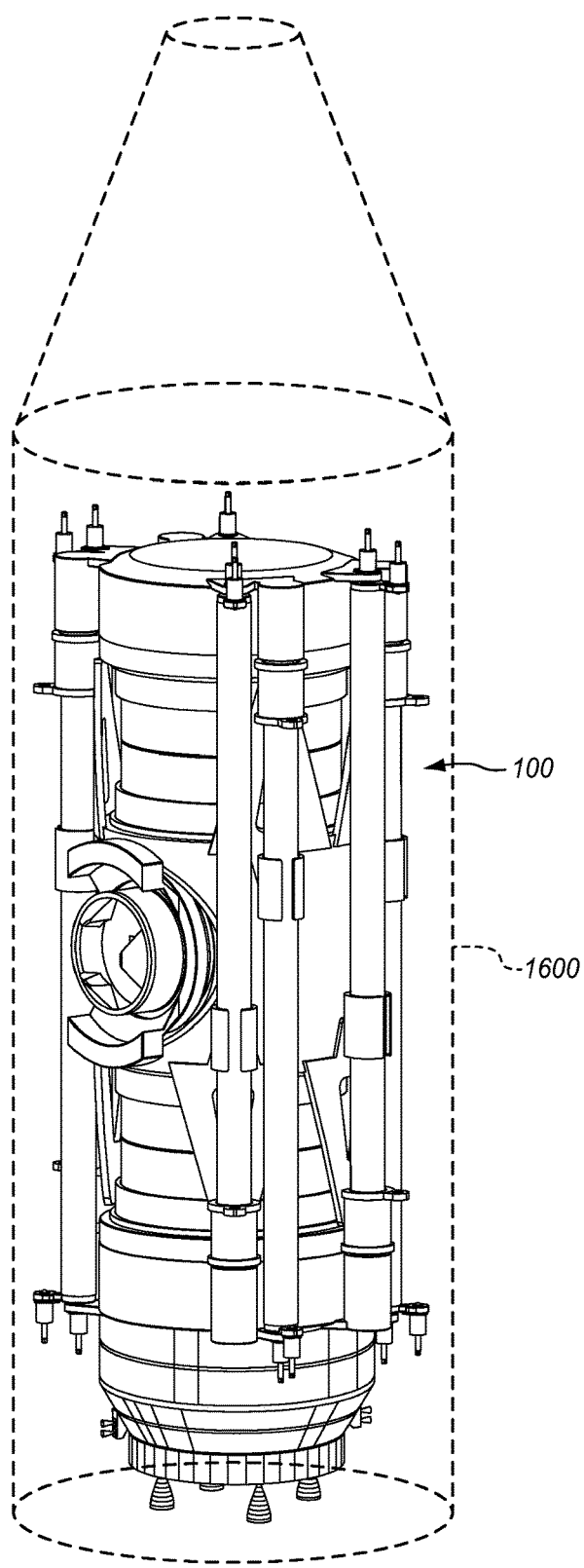
FIG. 16 illustrates a habitation module loaded into a launch vehicle in an exemplary embodiment.

HAB 100 is a one-piece unit that may be assembled on Earth and transported into space as a complete unit. Traditional HABs are often times modular, and are transported into space in pieces and assembled at the space station. HAB 100 is advantageous in that it does not need to be assembled in space, and can be transported as a complete unit. FIG. 16 illustrates HAB 100 loaded into a launch vehicle 1602 in an exemplary embodiment. For example, launch vehicle 1602 may be an Atlas rocket. Even though HAB 100 is a one-piece unit, gravity chambers 110-111 of HAB 100 are able to contract so that HAB 100 may have a compact size to fit in the cargo hold of launch vehicle 1602 as a complete unit. When in the contracted or launch configuration, launch locks 1102 secure extension rods 1020 and launch locks 1103 secure extension rods 1021 (see FIG. 11).

After launch vehicle 1602 transports HAB 100 into space, HAB 100 may separate from launch vehicle 1602. Launch locks 1102-1103 are released, and rotating structure 104 may be converted from the contracted configuration to an extended configuration (see FIG. 1). Rotating structure 104 is inflated and the pressure due to inflation pushes the end members 719 and 739 (see FIG. 7) of gravity chambers 110-111, respectively, outward in the radial direction. This in turn causes the ring members 710-718 and 730-738 of gravity chambers 110-111 to slide outward until the flanges of the ring members 710-718 and 730-738 engage (see FIG. 8). When fully extended, end 1026 of each extension rod 1020 may be affixed to a guide ring 1028 via safety lock 1027, and end 1036 of each extension rod 1021 may be attached to guide ring 1038 via safety lock 1037 (see FIG. 10). Extension of gravity chambers 110-111 increases the rotational radius of rotating structure 104. For example, rotating structure 104 may be extended to have a rotational radius of about 11 meters. Thus, the operational size of HAB 100 is not constrained by the size of the cargo hold of launch vehicle 1602.

Although specific embodiments were described herein, the scope is not limited to those specific embodiments. Rather, the scope is defined by the following claims and any equivalents thereof.

What is claimed is:

1. A habitation module comprising:
a rotating structure that is coupled to a stationary structure and rotates a bout an axis in relation to the stationary structure;
wherein the rotating structure includes:
a first gravity chamber that projects radially from the rotating structure; and
a second gravity chamber that projects radially from the rotating structure in an opposite direction than the first gravity chamber;
wherein the first gravity chamber and the second gravity chamber are each comprised of a plurality of ring members that form side walls of the first gravity chamber and the second gravity chamber;
wherein the ring members are concentric so that the side walls of the first gravity chamber and the second gravity chamber radially extend and radially contract in upon themselves.

2. The habitation module of claim 1 further comprising:
at least one radial pressure seal that forms an air-tight seal between the rotating structure and the stationary structure;
a first seal element that extends through an interior of the first gravity chamber to create an air-tight cavity within the interior of the first gravity chamber; and
a second seal element that extends through an interior of the second gravity chamber to create an air-tight cavity within the interior of the second gravity chamber.

3. The habitation module of claim 2 wherein:
the rotating structure further includes a hub member that slides onto the stationary structure, and attaches to the stationary structure through rotatable attachment members; and
each of the first gravity chamber and the second gravity chamber is comprised of:
a base member that is affixed to the hub member;
an end member that serves as a floor; and
the ring members that connect between the base member and the end member.

4. The habitation module of claim 3 wherein:
a middle one of the ring members between the base member and the end member has a diameter that is smallest among the ring members;
the ring members between the middle one of the ring members and the base member have a successively increasing diameter; and
the ring members between the middle one of the ring members and the end member have a successively increasing diameter.

5. The habitation module of claim 4 wherein the first seal element comprises:
a first tubular seal, wherein a first end of the first tubular seal is affixed around an inner surface of the end member, and a second end of the first tubular seal is affixed around an inner surface of the middle one of the ring members; and
a second tubular seal, wherein a first end of the second tubular seal is affixed around an inner surface of the base member, and a second end of the second tubular seal is affixed around the inner surface of the middle one of the ring members.

6. The habitation module of claim 3 wherein:
each of the ring members includes at least one flange that protrudes from the ring member to engage a neighboring ring member, the base member, or the end member.

7. The habitation module of claim 3 wherein the rotating structure includes:
first extension rods affixed at a first end to a first end member of the first gravity chamber;
first guide rings affixed to the hub member, wherein a second end of the first extension rods is configured to slide through the first guide rings;
second extension rods affixed at a first end to a second end member of the second gravity chamber; and
second guide rings affixed to the hub member, wherein a second end of the second extension rods is configured to slide through the second guide rings.

8. The habitation module of claim 7 wherein the rotating structure includes:
first safety locks that secure the second end of the first extension rods to one of the first guide rings when the first gravity chamber is extended; and
second safety locks that secure the second end of the second extension rods to one of the second guide rings when the second gravity chamber is extended.

9. The habitation module of claim 7 wherein the rotating structure includes:
first launch locks that secure the second end of the first extension rods to the second end member of the second gravity chamber when the first gravity chamber is contracted; and
second launch locks that secure the second end of the second extension rods to the first end member of the first gravity chamber when the second gravity chamber is contracted.

10. The habitation module of claim 3 wherein:
the stationary structure comprises a first cylindrical body member and a second cylindrical body member that are spaced apart and aligned co-axially via a support structure;
the rotatable attachment members comprise a pair of support bearings;
a first one of the support bearings is mounted between the first cylindrical body member and a first bearing housing of the hub member; and
a second one of the support bearings is mounted between the second cylindrical body member and a second bearing housing of the hub member.

11. The habitation module of claim 10 wherein the at least one radial pressure seal comprises:
a first radial pressure seal that spans a first gap between the first cylindrical body member and the first bearing housing of the hub member; and
a second radial pressure seal that spans a second gap between the second cylindrical body member and the second bearing housing of the hub member.

12. The habitation module of claim 10 further comprising:
a drive mechanism configured to rotate the rotating structure about the axis in relation to the stationary structure to simulate a gravitational force within the first gravity chamber and the second gravity chamber; and
a ring gear affixed to the first bearing housing of the hub member, and having teeth that mesh with teeth on the drive mechanism.

13. The habitation module of claim 1 further comprising:
a counter-rotating mechanism that rotates about the axis in an opposite direction than the rotating structure.

14. A habitation module comprising:
a stationary structure comprising a first cylindrical body member and a second cylindrical body member that are spaced apart and aligned co-axially via a support structure;
a rotating structure that attaches to the stationary structure through rotatable attachment members, and rotates a bout an axis in relation to the stationary structure, wherein the rotating structure includes:
 a hub member comprising a hollow cylinder with transverse openings that are coaxially aligned on opposing sides of the hub member along the axis to slide onto the stationary structure;
 a first gravity chamber that projects radially from a first end of the hub member; and
 a second gravity chamber that projects radially from a second end of the hub member in an opposite direction than the first gravity chamber;
 wherein the first gravity chamber and the second gravity chamber are each comprised of a plurality of ring members that form side walls of the first gravity chamber and the second gravity chamber;
 wherein the ring members are concentric so that the side walls of the first gravity chamber and the second gravity chamber radially extend and contract;
a first radial pressure seal mounted on the first cylindrical body member that spans a first gap between the first cylindrical body member and the hub member;
a second radial pressure seal mounted on the second cylindrical body member that spans a second gap between the second cylindrical body member and the hub member;
a first seal element that extends through an interior of the first gravity chamber to create an air-tight cavity within the interior of the first gravity chamber; and
a second seal element that extends through an interior of the second gravity chamber to create an air-tight cavity within the interior of the second gravity chamber.

15. The habitation module of claim 14 wherein:
each of the first gravity chamber and the second gravity chamber is comprised of:
 a base member that is affixed to the hub member;
 an end member that serves as a floor; and
 the ring members that connect between the base member and the end member.

16. The habitation module of claim 15 wherein:
a middle one of the ring members between the base member and the end member has a diameter that is smallest among the ring members;
the ring members between the middle one of the ring members and the base member have a successively increasing diameter; and
the ring members between the middle one of the ring members and the end member have a successively increasing diameter.

17. The habitation module of claim 16 wherein the first seal element comprises:
a first tubular seal, wherein a first end of the first tubular seal is affixed around an inner surface of the end member, and a second end of the first tubular seal is affixed around an inner surface of the middle one of the ring members; and
a second tubular seal, wherein a first end of the second tubular seal is affixed around an inner surface of the base member, and a second end of the second tubular seal is affixed around the inner surface of the middle one of the ring members.

18. The habitation module of claim 14 wherein:
the rotatable attachment members comprise support bearings;
a first one of the support bearings is mounted between the first cylindrical body member and a first bearing housing of the hub member; and
a second one of the support bearings is mounted between the second cylindrical body member and a second bearing housing of the hub member.

19. The habitation module of claim 18 wherein:
the first radial pressure seal spans the first gap between the first cylindrical body member and the first bearing housing of the hub member, and is mounted between the first one of the support bearings and an interior of the hub member; and
the second radial pressure seal spans the second gap between the second cylindrical body member and the second bearing housing of the hub member, and is mounted between the second one of the support bearings and the interior of the hub member.

20. A habitation module comprising:
a stationary structure;
a rotating structure that rotates a bout an axis in relation to the stationary structure, wherein the rotating structure includes:
 a hub member comprising a hollow cylinder with transverse openings that are coaxially aligned on opposing sides of the hub member along the axis to slide onto the stationary structure and attach to the stationary structure through rotatable attachment members;
 a first gravity chamber that projects radially from a first end of the hub member; and
 a second gravity chamber that projects radially from a second end of the hub member in an opposite direction than the first gravity chamber;
wherein each of the first gravity chamber and the second gravity chamber is comprised of:
 a base member that is affixed to the hub member;
 an end member that serves as a floor; and
 a plurality of ring members that connect between the base member and the end member to form a side wall;
 wherein the ring members are concentric so that the side wall radially extends and contracts.

21. The habitation module of claim 20 further comprising:
a first seal element that extends through an interior of the first gravity chamber to create an air-tight cavity within the interior of the first gravity chamber; and
a second seal element that extends through an interior of the second gravity chamber to create an air-tight cavity within the interior of the second gravity chamber.

22. The habitation module of claim 20 further comprising:
a first radial pressure seal and a second radial pressure seal;
wherein the stationary structure comprises a first cylindrical body member and a second cylindrical body member that are spaced apart and aligned co-axially via a support structure;
wherein the first radial pressure seal is mounted on the first cylindrical body member, and spans a first gap between the first cylindrical body member and the hub member; and
wherein the second radial pressure seal is mounted on the second cylindrical body member, and spans a second gap between the second cylindrical body member and the hub member.

* * * * *